(12) United States Patent
Zerfass et al.

(10) Patent No.: US 8,663,864 B2
(45) Date of Patent: Mar. 4, 2014

(54) SEALING ASSEMBLY FOR A FUEL CELL STACK

(75) Inventors: Hans-Rainer Zerfass, Taunusstein (DE); Armin Diez, Lenningen (DE); Peter Schenk, Hohenstein (DE); Wolfgang Fritz, Metzingen (DE); Peter Lamp, Kaufering (DE); Manfred Wier, München (DE); Joachim Tachtler, Ismaning (DE)

(73) Assignee: ElringKlinger AG, Dettingen (DE)

( * ) Notice: Subject to any disclaimer, the term of this patent is extended or adjusted under 35 U.S.C. 154(b) by 232 days.

(21) Appl. No.: 12/804,961

(22) Filed: Aug. 3, 2010

(65) Prior Publication Data

US 2010/0310964 A1    Dec. 9, 2010

Related U.S. Application Data

(62) Division of application No. 11/239,187, filed on Sep. 29, 2005, now abandoned.

(30) Foreign Application Priority Data

Sep. 30, 2004    (DE) .......................... 10 2004 047 539

(51) Int. Cl.
*H01M 2/20* (2006.01)

(52) U.S. Cl.
USPC ............ 429/467; 429/468; 429/469; 429/470

(58) Field of Classification Search
USPC ......... 429/469, 468, 470, 467, 452, 471, 508, 429/509, 507, 510; 427/115; 228/176, 228/179.1
See application file for complete search history.

(56) References Cited

U.S. PATENT DOCUMENTS

| 4,997,726 | A * | 3/1991 | Akiyama et al. | 429/30 |
|---|---|---|---|---|
| 5,399,442 | A | 3/1995 | Shundo | 429/32 |
| 6,656,625 | B1 | 12/2003 | Thompson et al. | 429/36 |
| 2002/0195778 | A1 | 12/2002 | Zerfass et al. | 277/628 |
| 2003/0132270 | A1 | 7/2003 | Weil et al. | 228/122.1 |
| 2004/0209147 | A1 | 10/2004 | Finkenwirth et al. | 429/35 |

FOREIGN PATENT DOCUMENTS

| DE | 43 33 478 A1 | 8/1994 | |
|---|---|---|---|
| DE | 198 41 919 | 3/2000 | |
| DE | 19841919 | * 3/2000 | ............. H01M 8/02 |
| DE | 101 22 327 A1 | 11/2002 | |
| DE | 101 25 776 A1 | 12/2002 | |
| DE | 101 25 777 A1 | 12/2002 | |
| DE | 103 02 122 A1 | 7/2004 | |
| EP | 1 629 936 A1 | 3/2006 | |
| WO | WO 02/17416 A2 | 2/2002 | |
| WO | WO 03/081693 A2 | 10/2003 | |
| WO | WO 2004/010523 | 1/2004 | |

* cited by examiner

*Primary Examiner* — Raymond Alejandro

(57) ABSTRACT

In a fuel cell stack having a plurality of fuel cell units, which are arranged consecutively in a stacking direction, wherein each of the fuel cell units comprises a housing with at least one housing part made of a metallic material, which has an adequate electrical insulation effect and an adequate mechanical strength at a high operating temperature of the fuel cell stack, a sealing assembly is provided and comprises at least one intermediate element made of a metallic material, wherein the intermediate element is soldered to a housing part of a first fuel cell unit at at least one location by a metal solder and is secured to a housing part of a second fuel cell unit at at least another location, wherein the intermediate element and/or the housing part of the first fuel cell unit is provided with a coating made of a ceramic material.

23 Claims, 23 Drawing Sheets

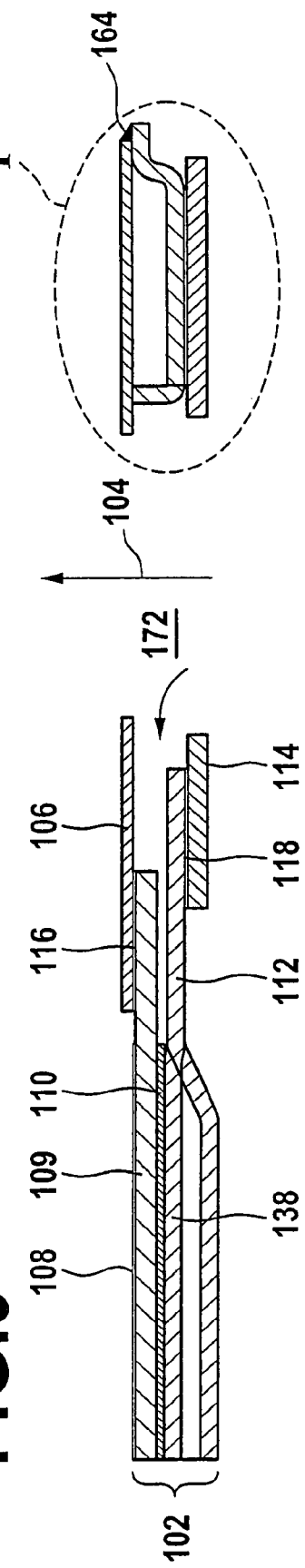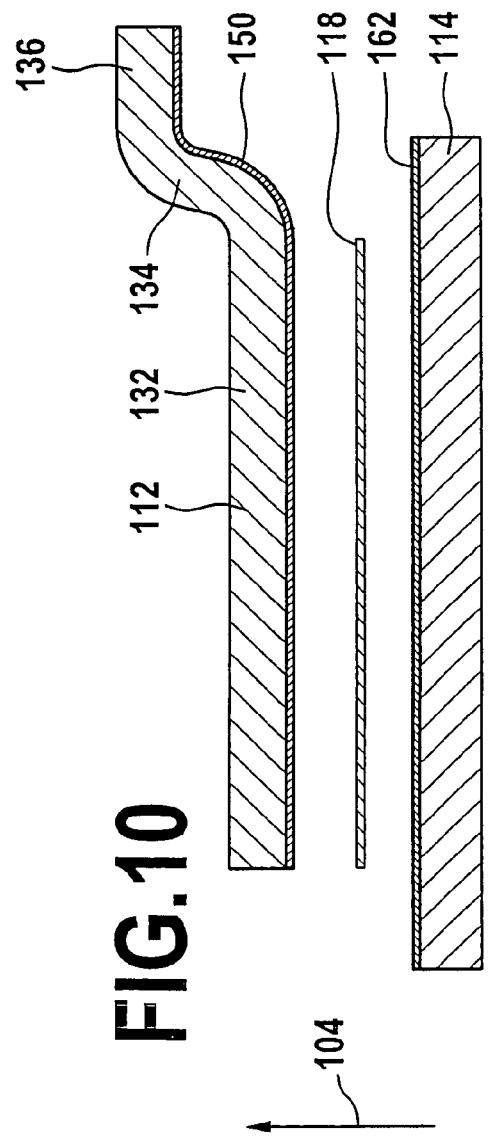
FIG.9
FIG.10

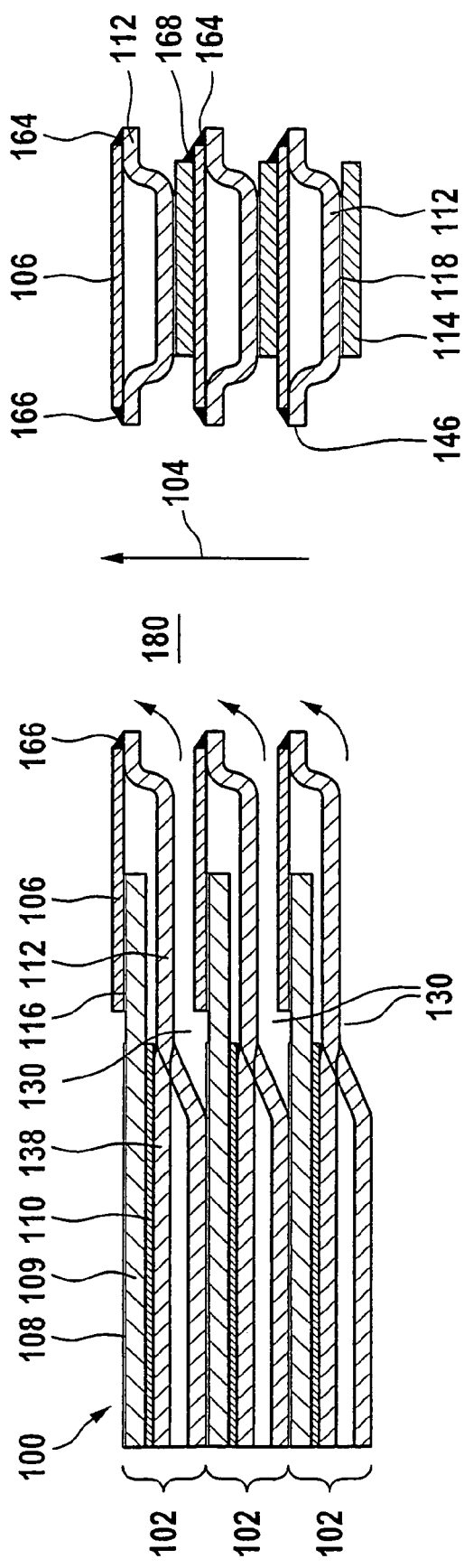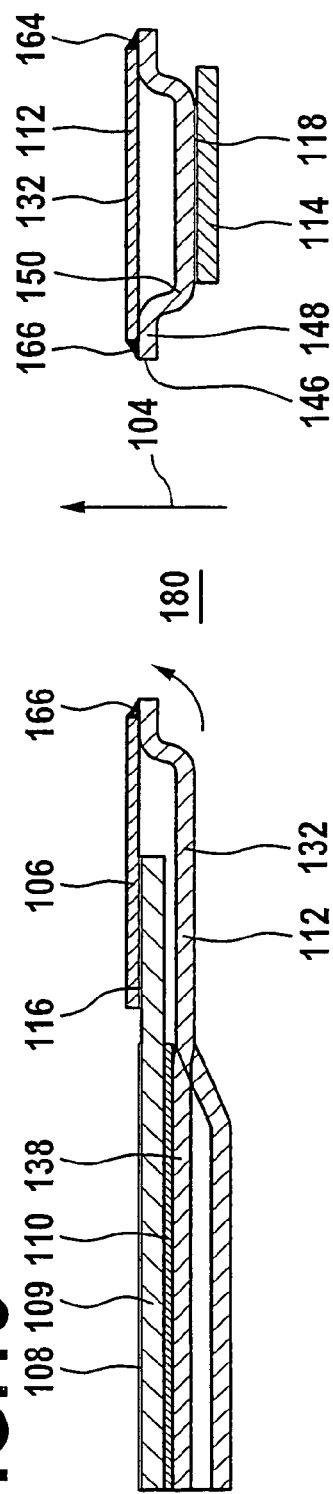

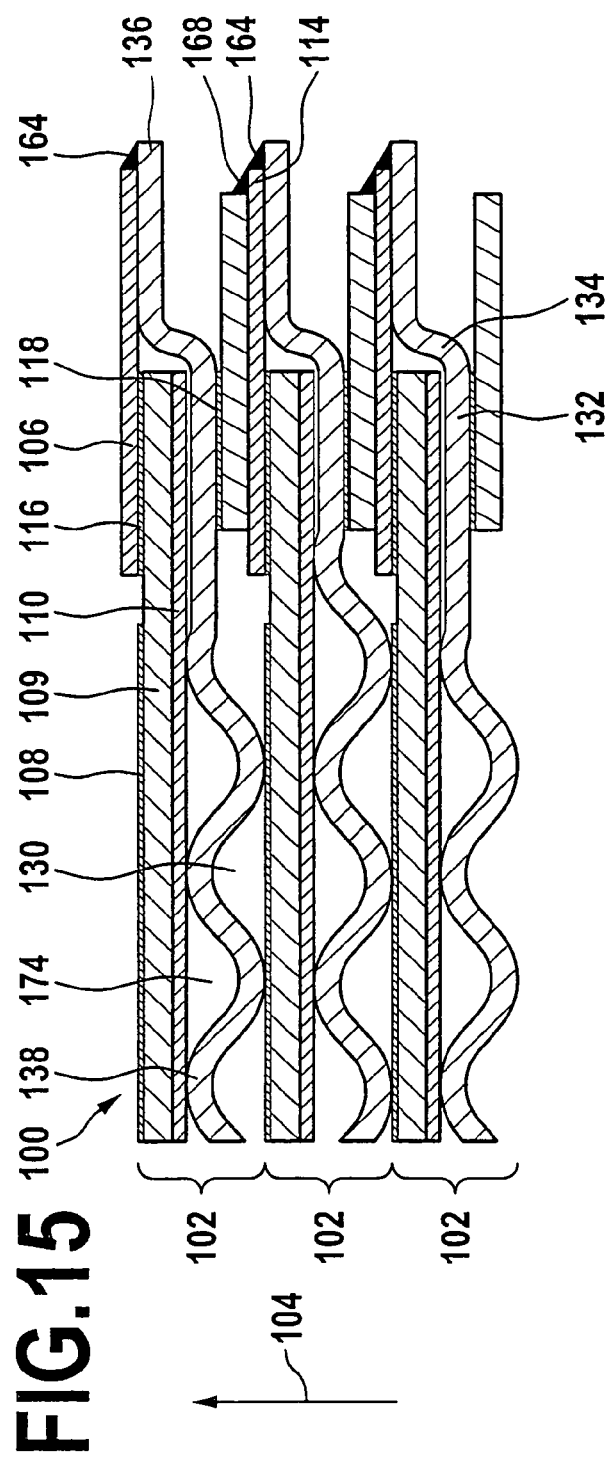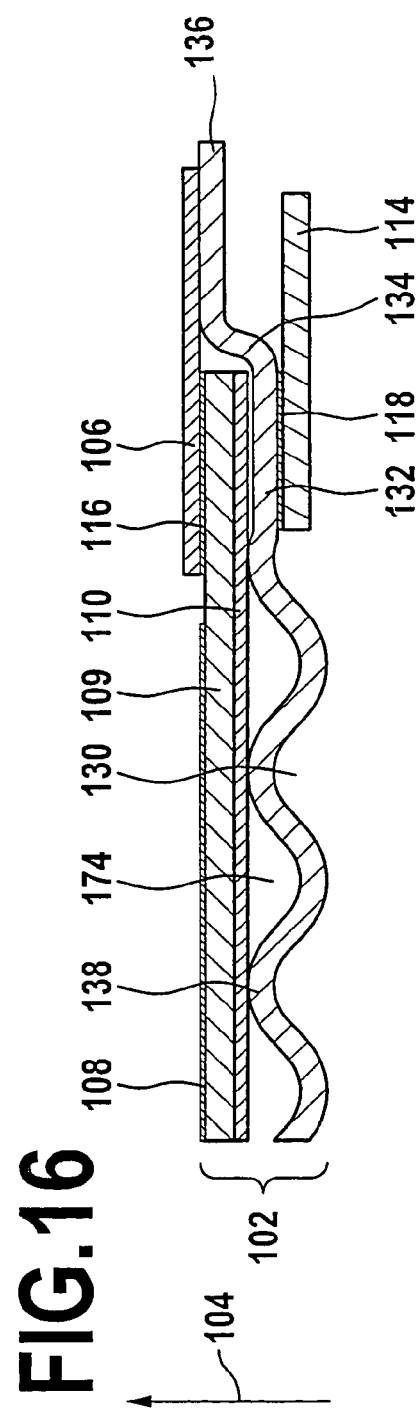

SEALING ASSEMBLY FOR A FUEL CELL STACK

CROSS REFERENCE TO RELATED APPLICATIONS

This application is a division of U.S. Ser. No. 11/239,187 filed Sep. 29, 2005, now abandoned, which claims priority of German application No. 10 2004 047 539.3 filed Sep. 30, 2004.

The present disclosure relates to the subject matter disclosed in German patent application No. 10 2004 047 539.3 of 30 Sep. 2004. The entire description of this earlier application is incorporated into the present description by reference.

FIELD OF THE INVENTION

The present invention relates to a sealing assembly for a fuel cell stack comprising a plurality of fuel cell units, which are arranged consecutively in a stacking direction, wherein each of the fuel cell units comprises a housing with at least one housing part made of a metallic material.

BACKGROUND OF THE INVENTION

For adjustment of the desired operating voltage, fuel cell units are arranged one on top of the other in the required number in order to form a fuel cell stack. To prevent an electrical short-circuit, the housings of fuel cell units arranged consecutively in the fuel cell stack are electrically insulated from one another. It is additionally necessary to separate the fuel gas ducts of the fuel cell units from the oxidising agent chambers of the fuel cell units in a gastight manner and the oxidising agent ducts of the fuel cell stack from the fuel gas chambers of the fuel cell units in a gastight manner.

In known fuel cell stacks, sealing and insulation elements made of glass solder or ceramic sealing materials are used in order to obtain the necessary electrical insulation effect and the necessary sealing effect.

In the case of some of the sealing materials usually used, the electrical resistance is no longer sufficiently high at the operating temperature of a high-temperature fuel cell unit (in the range of approximately 800° C. to approximately 900° C.) to attain a satisfactory insulation effect. Moreover, some of the sealing materials usually used have only a low stability with respect to the temperature changes (between operating and resting phases) that frequently arise with a high-temperature fuel cell unit.

BRIEF SUMMARY OF THE INVENTION

The object forming the basis of the present invention is to provide a sealing assembly for a fuel cell stack of the aforementioned type, which also has an adequate electrical insulation effect and an adequate mechanical strength at a high operating temperature of the fuel cell stack.

This object is achieved with a sealing assembly for a fuel cell stack comprising a plurality of fuel cell units, which are arranged consecutively in a stacking direction, according to the invention in that the sealing assembly comprises at least one intermediate element made of a metallic material, which is provided with a coating made of a ceramic material, wherein the intermediate element is soldered to a housing part of a first fuel cell unit by means of a metal solder at least one location provided with the ceramic coating, and is secured to a housing part of a second fuel cell unit at least another location.

The ceramic coating is formed from a ceramic material, which has an electrical insulation effect at the operating temperature of the fuel cell stack, so that the electrical insulation of fuel cell units arranged consecutively in the fuel cell stack is assured by this ceramic coating.

Since the electrical insulation is already achieved by the ceramic coating of the intermediate element, a metal solder having a high temperature stability and a high resistance to changes in temperature can be used for the mechanical connection of the housings of consecutive fuel cell units and for the seal of the fluid ducts, instead of a glass solder or a ceramic sealing material.

Moreover, the concept according to the invention allows a stable connection to be provided between the housings of fuel cell units arranged consecutively in the stacking direction in a simple manner by means of the intermediate element, so that the structure of the fuel cell stack can be achieved particularly simply and quickly by successively joining the fuel cell units onto one another.

Alternatively or additionally to a ceramic coating on the intermediate element, it can also be provided that the housing part of the first fuel cell unit, to which the intermediate element is soldered, is provided with such a ceramic coating.

Therefore, the object forming the basis of the invention is also achieved by a sealing assembly for a fuel cell stack comprising a plurality of fuel cell units, which are arranged consecutively in a stacking direction, wherein the sealing assembly comprises at least one intermediate element made of a metallic material, wherein the intermediate element is soldered to a housing part of a first fuel cell unit, which is provided with a coating made of a ceramic material, by means of a metal solder at least one location and is secured to a housing part of a second fuel cell unit at least another location.

The metal solder is solid at the operating temperature of the fuel cell stack.

The housing part of the first fuel cell unit is preferably formed from a metallic material and possibly provided with the ceramic coating.

The housing part of the second fuel cell unit is also preferably formed from a metallic material.

The housing of each fuel cell unit preferably comprises a housing lower part, a housing upper part and an intermediate element, which is secured to the housing lower part or to the housing upper part.

The at least one location, at which the intermediate element is secured to a housing part of a second fuel cell unit, is preferably a location that is not provided with the ceramic coating.

A particularly stable and quick and easy to produce connection between the fuel cell units is achieved if the intermediate element is welded and/or soldered to the housing part of the second fuel cell unit.

In a preferred configuration of the invention it is provided that the intermediate element comprises a frame part, which extends in a ring shape around fluid ducts passing through the fuel cell stack in the stacking direction.

In addition, it can be provided that the intermediate element comprises at least one duct boundary part, which is connected to the frame part and either alone or together with the frame part encloses one of the fluid ducts passing through the fuel cell stack.

It is preferably provided that the intermediate element respectively has a duct boundary part associated with the respective duct for each fuel gas feed duct and each fuel gas discharge duct of the fuel cell stack.

Alternatively or additionally hereto, it can be provided that the intermediate element respectively comprises a duct boundary part for each oxidising agent feed duct and each oxidising agent discharge duct of the fuel cell stack.

Production of the intermediate element is particularly simple in configuration if the intermediate element is formed from a sheet metal.

It is preferably provided that the intermediate element is formed from a highly corrosion-resistant steel, e.g. from Crofer 22 APU. As a result, a sufficient corrosion-resistance of the intermediate element is also achieved at the high operating temperature of an SOFC (solid oxide fuel cell) unit.

It is particularly favourable if the corrosion-resistant steel commercially available under the trade name "Aluchrom Y" or also "FeCrAlY" is used as material for the intermediate element.

In principle, the ceramic coating of the intermediate element or the housing part of the first fuel cell unit can be formed from any ceramic material, which has a sufficiently high specific electrical resistance at the operating temperature of the fuel cell stack.

Ceramic coatings that are particularly suitable are those composed of aluminium oxide and/or titanium dioxide and/or zirconium dioxide and/or magnesium oxide.

The ceramic coating of the intermediate element or the housing part of the first fuel cell unit can be generated on the intermediate element by thermal spraying, in particular by atmospheric plasma spraying, by vacuum plasma spraying or by flame spraying. Other processes such as the sol-gel process, for example, can also be used for the production of the ceramic coating.

In a particular configuration of the sealing assembly according to the invention, it is provided that the intermediate element and/or the housing part of the first fuel cell unit is formed from a metal alloy, which contains an oxidisable component.

In particular, it can be provided that the metal alloy contains aluminium and/or zirconium as oxidisable component.

When an oxidisable component is present in the metal alloy, from which the intermediate element or the housing part of the first fuel cell unit is formed, the ceramic coating of the intermediate element or housing part can be produced by oxidation of an oxidisable component, e.g. aluminium and/or zirconium, of the metal alloy.

The ceramic coating of the intermediate element or the housing part of the first fuel cell unit preferably has a thickness of approximately 20 μm to approximately 1000 μm.

A silver-based solder can be used in particular for soldering the intermediate element to the housing part of the first fuel cell unit.

Such a silver-based solder can be used with or without an addition of copper.

If the silver-based solder is used without added copper, then it is favourable if the silver-based solder contains an addition of copper oxide, since the silver-based solder wets ceramic surfaces better as a result of the addition of copper oxide.

Moreover, the silver-based solder can have added titanium to improve wetting.

Active solders, e.g. copper-based active solders, can also be used advantageously.

The solder used for soldering the intermediate element to the housing part of the first fuel cell unit is produced from an intimate mix of the components, from which the soldering alloy is formed only on heating to the soldering temperature in situ.

The at least one location, at which the housing part of the first fuel cell unit is soldered to the intermediate element, can also be provided with an electrically insulating ceramic coating. However, since the electrical insulation between the housings of the consecutive fuel cell units is already assured by the ceramic coating of the intermediate element, such a ceramic coating of the housing part of the first fuel cell unit is not absolutely necessary.

The intermediate element of the sealing assembly can, for example, be provided with a ceramic coating only on the side facing the housing part of the first fuel cell unit.

However, alternatively hereto it can also be provided that the intermediate element is provided with a ceramic coating both on a side facing the housing part of the first fuel cell unit and on a side facing the housing part of the second fuel cell unit. A particularly favourable electrical insulation effect of the sealing assembly according to the invention is achieved by the provision of two ceramic coatings on the sides of the intermediate element respectively facing the housing parts to be sealed.

In this case, the ceramic coating on the side facing the housing part of the second fuel cell unit can be the same with respect to the material used and/or the layer thickness used as the ceramic coating on the side of the intermediate element facing the housing part of the first fuel cell unit, or differ therefrom.

In a particular configuration of the sealing assembly according to the invention, it is additionally provided that the intermediate element is soldered to the housing part of the second fuel cell unit by means of a metal solder at least one location provided with a ceramic coating.

The intermediate element of the sealing assembly according to the invention can be configured in a single piece.

However, alternatively hereto, it can also be provided that the intermediate element comprises at least two separate intermediate element parts, which are connected to one another.

In particular, the at least two separate intermediate element parts can be welded and/or soldered to one another.

It is preferably provided that at least two separate intermediate element parts are stacked one on top of the other in the stacking direction of the fuel cell stack.

In particular, it can be provided that at least one intermediate element part projects over an adjacent intermediate element part on an inside edge and/or on an outside edge. In this way it is possible, for example, to connect the two intermediate element parts to one another by a weld running along the inside edge or the outside edge, and additionally secure the intermediate element part projecting over the adjacent intermediate element part to the housing part of the second fuel cell unit by means of a weld running along the outside edge or the inside edge of the intermediate element part.

In a preferred configuration of the invention, it is provided that at least two intermediate element parts are connected to one another so that at least one region of one intermediate element part can move relative to a region of the other intermediate element part. In this way, the multiple-part intermediate element can serve to balance component tolerances as well as to reduce tensile stresses, which arise as a result of contraction during cooling of the welds or when the fuel cell stack cyclically heats up to operating temperature and cools to ambient temperature.

In particular, the at least two intermediate element parts can be connected to one another so that at least one region of one intermediate element part can move relative to a region of the other intermediate element part in the stacking direction of the fuel cell stack.

A further object forming the basis of the present invention is to provide a process for the production of a fuel cell stack comprising a plurality of fuel cell units, which are arranged consecutively in a stacking direction, wherein each of the fuel cell units comprises a housing with at least one housing part made of a metallic material, through which the housings of the fuel cell units can be connected to one another so that an adequate gastightness and an adequate mechanical strength are also assured at a high operating temperature.

This object is achieved according to the invention by a process comprising the following process steps:

provision of an intermediate element made of a metallic material, which is provided with a coating made of a ceramic material;

soldering the intermediate element to a housing part of a first fuel cell unit by means of a metal solder at least one location provided with the ceramic coating;

securing the intermediate element to a housing part of a second fuel cell unit at least another location.

Alternatively or additionally to an intermediate element with an electrically insulating ceramic coating, a housing part of the first fuel cell unit, which is provided with such an electrical insulating ceramic coating, can also be used.

Therefore, the object forming the basis of the invention is also achieved according to the invention by a process comprising the following process steps;

provision of an intermediate element made of a metallic material;

soldering the intermediate element to a housing part of a first fuel cell unit, which is provided with a coating made of a ceramic material, by means of a metal solder at least one location;

securing the intermediate element to a housing part of a second fuel cell unit at least another location.

Special configurations of the process according to the invention are the subject of the dependent process claims, the advantages of which have already been explained above in association with particular configurations of the structural element according to the invention.

Further features and advantages of the invention are the subject of the following description and the representation in the drawing of an embodiment:

BRIEF DESCRIPTION OF THE DRAWINGS

FIG. 9 is a section from FIG. 8 showing a vertical section through only one fuel cell unit of the fuel cell stack;

FIG. 10 is an enlarged exploded view of region I in FIG. 9;

FIG. 12 is a schematic view in vertical section through the fuel cell stack in the region of an oxidising agent duct, taken along line 12-12 in FIG. 6;

FIG. 13 is a section from FIG. 12 showing a vertical section through only one fuel cell unit of the stack;

FIG. 15 is a schematic view in vertical section through the fuel cell stack in a region outside the fluid ducts, taken along line 15-15 in FIG. 6;

FIG. 16 is a section from FIG. 15 showing only one of the fuel cell units of the fuel cell stack;

DETAILED DESCRIPTION OF THE INVENTION

Figure 1:
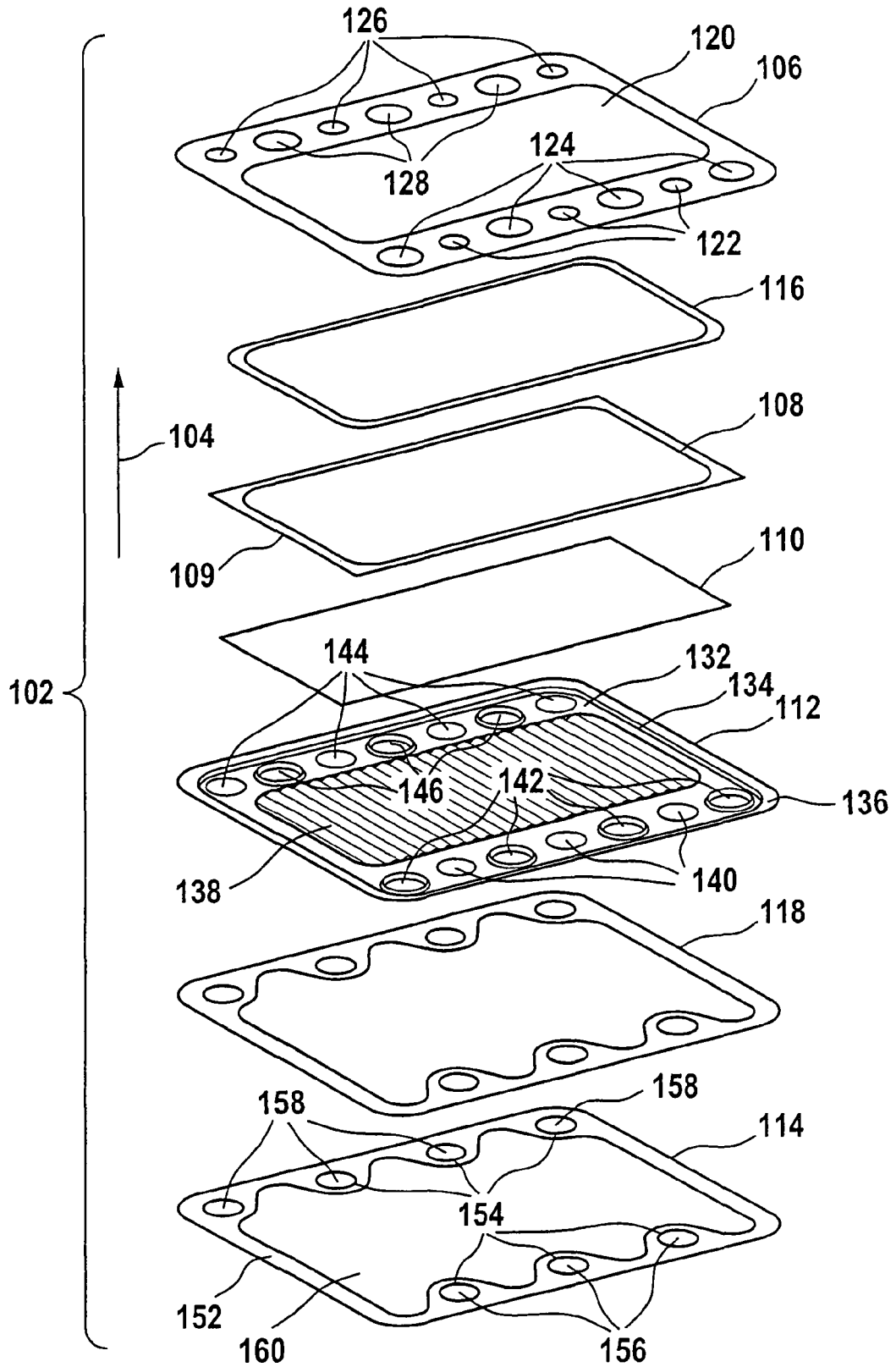
FIG. 1 is a schematic exploded view of the elements of a fuel cell unit.

Identical or functionally equivalent elements have been given the same reference numerals in all the figures.

A fuel cell stack shown in FIGS. 5 to 16, given the overall reference 100, comprises a plurality of fuel cell units 102, each having the same structure, which are stacked on top of one another in a vertical stacking direction 104.

Each of the fuel cell units 102 comprises the components shown individually in FIG. 1, namely a housing upper part 106, a cathode-electrolyte-anode unit (CEA unit) 108 on a substrate 109, a contact material 110, a housing lower part 112 and an intermediate element 114.

FIG. 1 additionally shows a first solder layer 116 for soldering the substrate 109 to the housing upper part 106 and a second solder layer 118 for soldering the intermediate element 114 to the housing lower part 112.

The housing upper part 106 is configured as a substantially rectangular and substantially plane sheet metal plate, which is provided with a substantially rectangular central passage 120, through which in the finished assembled state of the fuel cell unit the CEA unit 108 of the fuel cell unit 102 is accessible for contacting through the housing lower part 112 of the fuel cell unit 102 located above it in the stacking direction 104.

Provided on one side of the passage 120 is the housing upper part 106 with a plurality of, e.g. three, fuel gas feed openings 122, which are arranged alternately with a plurality of, e.g. four, oxidising agent feed openings 124.

Provided on the opposite side of the passage 120 is the housing upper part 106 with a plurality of, e.g. four, fuel gas discharge openings 126, which are arranged alternately with a plurality of, e.g. three, oxidising agent discharge openings 128.

The housing upper part 106 is preferably made from a highly corrosion-resistant steel, e.g. from the alloy Crofer 22.

The material Crofer 22 has the following composition: 22% by weight of chromium, 0.6% by weight of aluminium, 0.3% by weight of silicon, 0.45% by weight of manganese, 0.08% by weight of titanium, 0.08% by weight of lanthanum, the rest iron.

This material is distributed by ThyssenKrupp VDM GmbH, Plettenberger Straße 2, 58791 Werdohl, Germany.

The CEA unit 108 comprises an anode arranged directly on the upper side of the substrate 109, an electrolyte arranged above the anode and a cathode arranged above the electrolyte, wherein these individual layers of the CEA unit 108 are not illustrated individually in the drawings.

The anode is formed from a ceramic material, which is electrically conductive at the operating temperature of the fuel cell unit (from approximately 800° C. to approximately 900° C.), e.g. $ZrO_2$ or an $NiZrO_2$ cermet (ceramic-metal mixture), which is porous to enable a fuel gas passing through the substrate 109 to pass through the anode to the electrolyte adjoining the anode.

A gas mixture containing hydrocarbons or pure hydrogen, for example, can be used as fuel gas.

The electrolyte is preferably a solid electrolyte, in particular in the form of a solid oxide electrolyte, and formed, for example, from yttrium-stabilised zirconium dioxide. The electrolyte is electronically non-conductive both at ambient temperature and at operating temperature. In contrast, its ionic conductivity increases as the temperature increases.

The cathode is formed from a ceramic material, which is electrically conductive at the operating temperature of the fuel cell unit, e.g. $(La_{0.8}Sr_{0.2})_{0.98}MnO_3$, and is porous to enable an oxidising agent, e.g. air or pure oxygen, from an oxidising agent chamber 130 adjoining the cathode to pass to the electrolyte.

The gastight electrolyte of the CEA unit 108 extends as far as the edge of the gas-permeable anode, wherein the cathode surface is smaller than the anode surface, so that the electrolyte can be soldered in its edge region to the housing upper part 106.

The substrate 106 can be configured, for example, as a porous sintered body made of sintered metal particles.

The contact material 110, which is arranged between the substrate 109 and the housing lower part 112, can be, for example, a mesh, knitted fabric or nonwoven fabric made of nickel wire.

The housing lower part 112 is configured as a sheet metal moulding and comprises a substantially rectangular plate 132, which is oriented perpendicular to the stacking direction 104 and which merges at its edges via a sloping section 134 into an edge flange 136, which is likewise oriented substantially perpendicular to the stacking direction 104.

The plate 132 has a substantially rectangular central contact field 138, which is provided on one side with contact elements for connecting the contact material 110 and on the other side with the cathode of a CEA unit 108 of an adjacent fuel cell unit 102, which can be configured, for example, in corrugated sheet form or nub form.

On one side of the contact field 139, the plate 132 is provided with a plurality of, e.g. three, fuel gas feed openings 140, which are alternately arranged with a plurality of, e.g. four, oxidising agent feed openings 142.

The fuel gas openings 140 and the oxidising agent feed openings 142 of the housing lower part 112 are aligned with the fuel gas feed openings 122 and the oxidising agent feed openings 124 respectively of the housing upper part 106.

On the other side of the contact field 138, the plate 132 is provided with a plurality of, e.g. four, fuel gas discharge openings 144, which are alternately arranged with a plurality of, e.g. three, oxidising agent discharge openings 146.

The fuel gas discharge openings 144 and the oxidising agent discharge openings 146 of the housing lower part 112 are aligned with the fuel gas discharge openings 126 and with the oxidising agent discharge openings 128 respectively of the housing upper part 106.

Oxidising agent discharge openings 146 preferably lie opposite fuel gas feed openings 140, and fuel gas discharge openings 144 preferably lie opposite oxidising agent feed openings 142.

Figure 11:
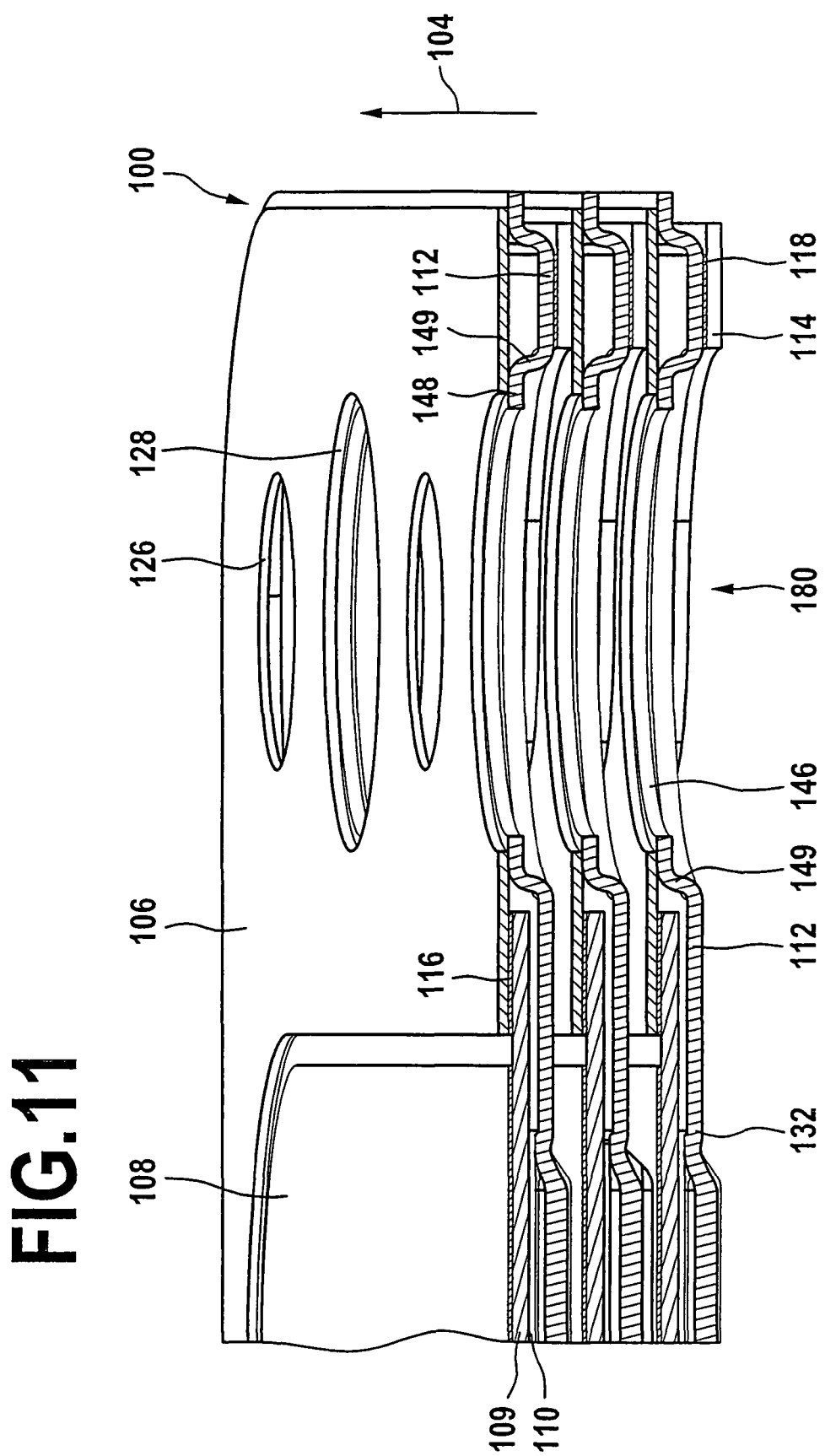
FIG. 11 is a sectional perspective view of the fuel cell stack, viewed in partial section in the region of an oxidising agent duct.
Figure 14:
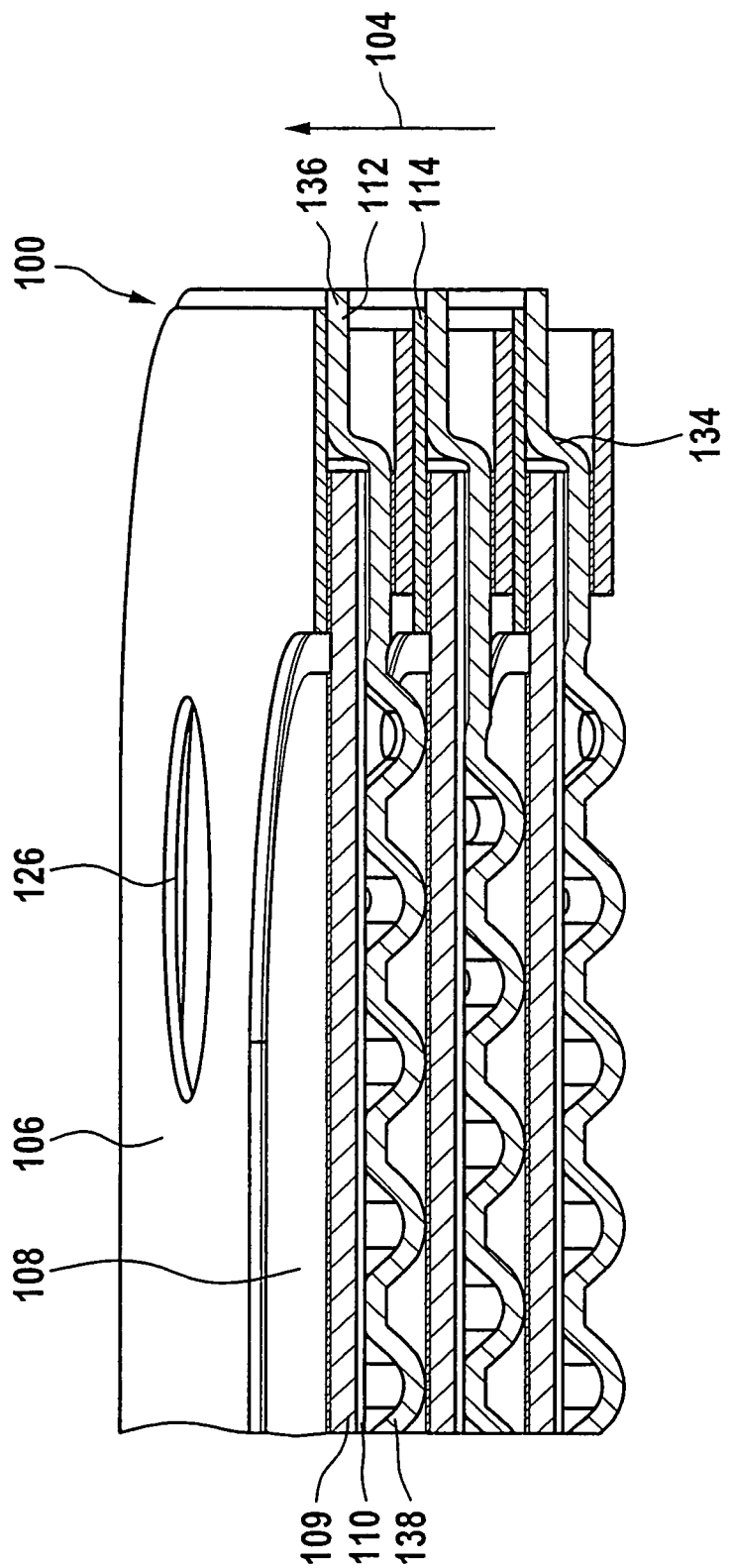
FIG. 14 is a sectional perspective view of the fuel cell stack, viewed in partial section in a region outside the fluid ducts.
Figure 17:
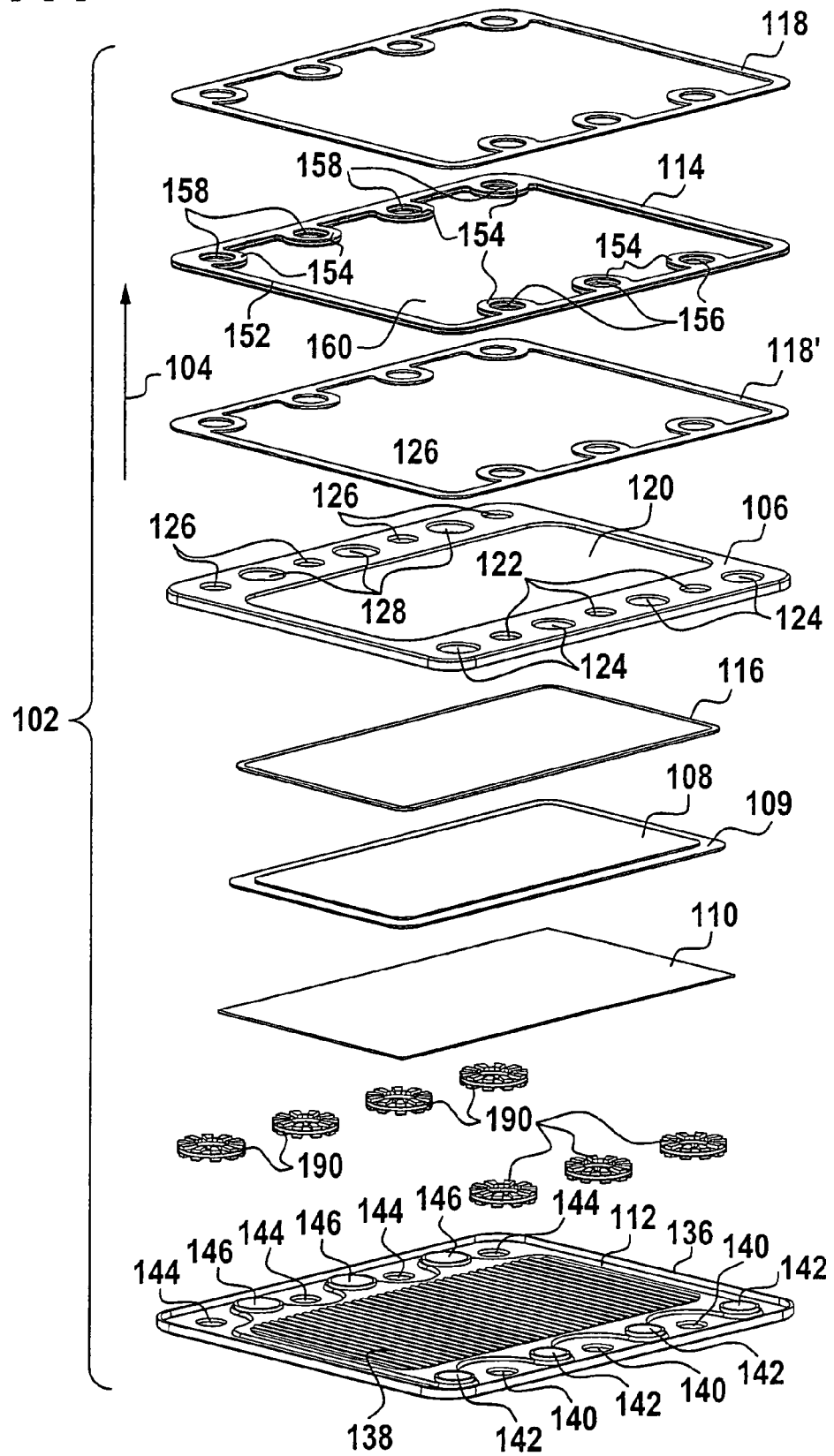
FIG. 17 is a schematic exploded view of the elements of a second embodiment of the fuel cell stack.

As may best be seen from FIGS. 11 to 13, the oxidising agent discharge openings 146 (like oxidising agent feed openings 142) of the housing lower part 112 are respectively surrounded by a ring flange 148, which surrounds the respective opening in a ring shape and is oriented substantially perpendicular to the stacking direction 104 and which is connected to the plate 132 of the housing lower part 112 via a sloping section 149.

The housing lower part 112 is preferably made from a highly corrosion-resistant steel, e.g. from the alloy Crofer 22 already mentioned above.

As may be seen from FIG. 10, the housing lower part 112 is provided on its underside facing the intermediate element 114 with a ceramic coating 150 made of a ceramic material, which has an electrical insulating effect at the operating temperature of the fuel cell unit 102.

The ceramic coating 150 of the housing lower part 112 can extend over the entire underside of the housing lower part 112 (except for the underside of the contact field 138) or can also only extend over the locations at which the housing lower part 112 is soldered to the intermediate element 114.

The electrically insulating ceramic coating 150 is applied in a layer thickness of approximately 30 µm, for example, to approximately 500 µm, for example, by thermal spraying.

Processes suitable for this are, for example, atmospheric plasma spraying, vacuum plasma spraying or flame spraying.

The following insulation materials to be applied by thermal spraying are suitable, for example, as material for the ceramic coating 150:
- 99.5% aluminium oxide;
- a mixture of 97% by weight of aluminium oxide and 3% by weight of titanium dioxide;
- 5YSZ or 8YSZ yttrium-stabilised zirconium dioxide;
- a mixture of 70% by weight of aluminium oxide and 30% by weight of magnesium oxide;
- an aluminium-magnesium spinel.

The ceramic coating 150 of the housing lower part 112 is not absolutely necessary for the operation of the fuel cell unit 102 and could also be omitted.

The intermediate element 114 comprises a substantially rectangular frame part 152, which extends in a ring shape along the edge of the fuel cell unit 102, and also duct boundary parts 154, which are connected in one piece with the frame part 152 and are configured so that together with the frame part 152 they enclose a respective fuel gas feed opening 156 or a respective fuel gas discharge opening 158 of the intermediate element 114.

Fuel gas feed openings 156 and fuel gas discharge openings 158 of the intermediate element 114 are aligned with fuel gas feed openings 140 and fuel gas discharge openings 122 respectively of the housing lower part 112 and with fuel gas feed openings 122 and fuel gas discharge openings 126 respectively of the housing upper part 106.

The intermediate element 114 is made from a substantially plane metal sheet by stamping out fuel gas feed openings 156 and fuel gas discharge openings 158 as well as a central passage 160.

A highly corrosion-resistant steel, e.g. the alloy Crofer 22 already mentioned above, is preferably used as material for the intermediate element 114.

As may be seen from FIG. 10, the intermediate element 114 is provided on its upper side facing the housing lower part 112 with a ceramic coating 162 made of a ceramic material, which has an electrical insulating effect at the operating temperature of the fuel cell unit 102.

The ceramic coating 162 can extend over the entire upper side of the intermediate element 114, or can also only extend over the locations at which the intermediate element 114 is soldered to the housing lower part 112.

This electrically insulating ceramic coating 162 can be applied, for example, in a layer thickness of approximately 30 μm to approximately 500 μm, for example, by thermal spraying.

Processes suitable for this are, for example, atmospheric plasma spraying, vacuum plasma spraying or flame spraying.

Suitable insulation materials, which are to be applied onto the intermediate element 114 by such a thermal spraying process, are, for example:
- 99.5% aluminium oxide;
- a mixture of 97% by weight of aluminium oxide and 3% by weight of titanium dioxide;
- 5YSZ or 8YSZ yttrium-stabilised zirconium dioxide;
- a mixture of 70% by weight of aluminium oxide and 30% by weight of magnesium oxide.

Alternatively to an intermediate element 114 with a ceramic insulation layer applied by thermal spraying, an intermediate element 114 made of a highly corrosion-resistant steel containing aluminium can also be used, which has been provided with a ceramic coating 162 of aluminium oxide by pre-oxidation of the metallic material containing aluminium.

In particular, such an intermediate element 114 can be formed from the steel alloy known by the designation "FeCrAlY" or also "Aluchrom Y".

The composition of the FeCrAlY alloy is as follows: 30% by weight of chromium, 5% by weight of aluminium, 0.5% by weight of yttrium, and the rest iron.

The intermediate element 114 produced by being stamped out of a sheet of this steel alloy is introduced into an oxygen-containing atmosphere (e.g. in air) and held at a temperature of approximately 1100° C. for a period of two hours, for example. As a result of this temperature treatment in an oxygen-containing atmosphere, the ceramic coating 162 of aluminium oxide is generated on the free outer surfaces of the intermediate element 114.

The procedure for the production of the fuel cell units 102 shown in FIG. 4 from the above-described individual elements is as follows:

Firstly, the housing lower part 112 is provided with the ceramic coating 150 in the manner described above and the intermediate element 114 is provided with the ceramic coating 162 in the manner described above.

The substrate 109, on which the CEA unit 108 is arranged, is then soldered along the edge of its upper side to the housing upper part 106, i.e. on the underside of the region of the housing upper side 106 surrounding the passage 120 in the housing upper part 106.

As shown in FIG. 1, the soldering material necessary for this can be inserted between the substrate 109 and the housing upper part 106 in the form of a soldering foil appropriately cut to length, or can be applied by means of a dispenser in the form of a bead of soldering material onto the upper side of the substrate 109 and/or onto the underside of the housing upper part 106. Moreover, it is also possible to apply the soldering material by means of a pattern printing process, e.g. a screen printing process, onto the upper side of the substrate 109 and/or onto the underside of the housing upper part 106.

The soldering material used can be a silver-based solder with added copper, e.g. a silver-based solder with the composition (in % mol.) of Ag-4Cu or Ag-8Cu.

The soldering is conducted in an atmosphere of air. The soldering temperature amounts to 1050° C., for example, the soldering time amounts to approximately 5 minutes, for example. Copper oxide is formed in situ during the soldering in air.

Alternatively, a silver-based solder without added copper can also be used as soldering material. Such a copper-free solder has the advantage of a higher solidus temperature (this amounts to approximately 960° C. without copper addition and approximately 780° C. with copper addition). Since pure silver does not wet ceramic surfaces, copper(II) oxide is added to silver-based solders without added copper to reduce the wetting angle. Soldering with silver-based solders without added copper is conducted in an atmosphere of air or in a protective gas atmosphere, e.g. with argon.

In this case, the soldering temperature likewise preferably amounts to approximately 1050° C. and the soldering time amounts to approximately 5 minutes, for example.

Alternatively to soldering the substrate 109 with the CEA unit 108 arranged thereon into the housing upper part 106, it can also be provided that a substrate 109, on which the CEA unit 108 has not yet been produced, is welded to the housing upper part 106 and after welding, the electrochemically active layers of the CEA unit 108, i.e. its anode, electrolyte and cathode, are generated one after the other on the substrate 109, which is already welded to the housing upper part 106, using the vacuum plasma spraying process.

Figure 2:
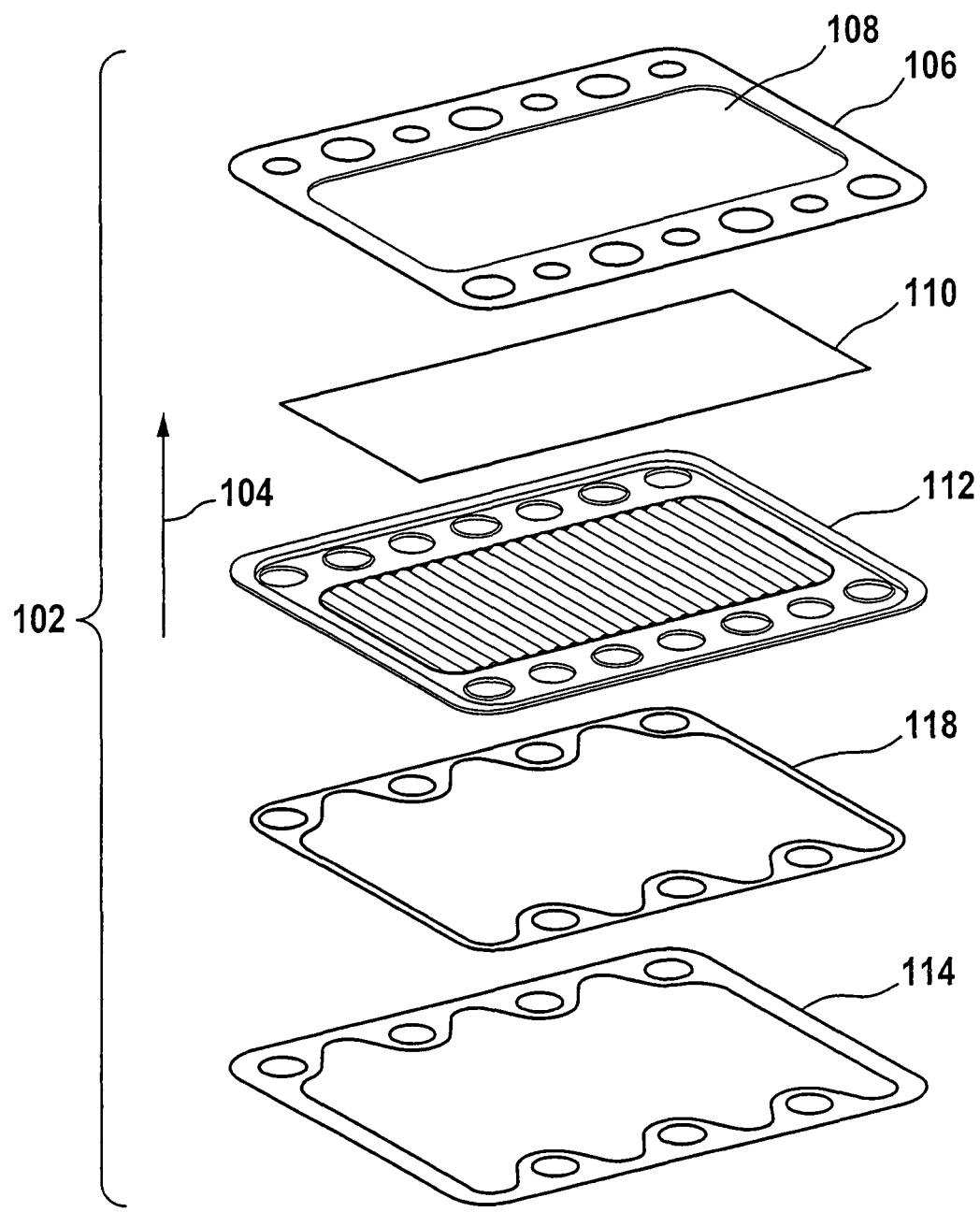
FIG. 2 is a schematic exploded view of the fuel cell unit from FIG. 1 after a substrate of a CEA unit of the fuel cell unit has been soldered to a housing upper part of the fuel cell unit.

The position shown in FIG. 2 is reached after the substrate 109 has been connected to the housing upper part 106.

On its side facing the housing lower part 112 and provided with the ceramic coating 162, the intermediate element 114 is now soldered by means of a soldering material to the housing lower part 112 on its side facing the intermediate element 114 and provided with the ceramic coating 150.

In this case, the same soldering materials can be used as have already been described above in association with the soldering of the substrate 109 and the housing upper part 106, and the soldering process can be conducted under the same conditions.

In particular, therefore, as shown in FIG. 2, the soldering material necessary for this can be inserted between the intermediate element 114 and the housing lower part 112 in the form of a soldering foil appropriately cut to length, or can be applied by means of a dispenser in the form of a bead of soldering material onto the upper side of the intermediate element 114 and/or onto the underside of the housing lower part 112. Moreover, it is also possible to apply the soldering material by means of a pattern printing process, e.g. a screen printing process, onto the upper side of the intermediate element 114 and/or onto the underside of the housing lower part 112.

The soldering material used can be a silver-based solder with added copper, e.g. a silver-based solder with the composition (in % mol.) of Ag-4Cu or Ag-8Cu.

The soldering is conducted in an atmosphere of air. The soldering temperature amounts to 1050° C., for example, the soldering time amounts to approximately 5 minutes, for example. Copper oxide is formed in situ during the soldering in air.

Alternatively, a silver-based solder without added copper can also be used as soldering material. Such a copper-free solder has the advantage of a higher solidus temperature (this amounts to approximately 960° C. without copper addition and approximately 780° C. with copper addition). Since pure silver does not wet ceramic surfaces, copper(II) oxide is added to the silver-based solders without added copper to reduce the wetting angle. Soldering with silver-based solders without added copper is conducted in an atmosphere of air or in a protective gas atmosphere, e.g. with argon.

Suitable silver-based solders without added elemental copper are those with the composition (in % mol.), for example, of Ag-4CuO or Ag-8CuO.

An addition of titanium can be used to further improve the wetting (reduce the wetting angle). An intimate mix of the appropriate components in powdered form is used to produce the solders. The soldering alloy is formed in situ from this heterogeneous mixture. Titanium is added to this intimate mix in the form of titanium hydride. A metallic titanium is formed from the hydride at approximately 400° C.

Suitable silver-based solders without added elemental copper, but with added titanium, are those with the composition (in % mol.), for example, of Ag-4CuO-0.5Ti or Ag-8CuO-0.5Ti.

In this case, the soldering temperature likewise preferably amounts to approximately 1050° C. and the soldering time amounts to approximately 5 minutes, for example.

Moreover, active solders can also be used as soldering material for soldering the intermediate element 114 to the housing lower part 112.

Active solders are metal alloys, which contain surface-active elements (e.g. titanium, zirconium, hafnium, niobium and/or tantalum) in small quantities, and are thus able to reduce the interfacial energy between the ceramic material and the molten solder sufficiently to enable wetting of the ceramic material by the solder.

The active soldering method using active solders enables ceramic-ceramic/metal bonds to be produced in a single-stage joining process without previous metallisation of the ceramic joining surfaces. The wetting of the ceramic joining surfaces through the solder is assured by the use of an active solder in this case.

A suitable active solder is distributed, for example, under the trade name "Copper ABA" by Wesgo Metals, 610 Quarry Road, San Carlos, Calif. 94070, USA.

This active solder has the following composition: 2% by weight of Al, 92.7% by weight of Cu, 3% by weight of Si and 2.3% by weight of Ti.

The soldering process can be conducted in particular in accordance with the following temperature schedule:

if the soldering material is applied in the form of a soldering paste, the soldering paste is dried at a temperature of approximately 150° C. for a period of approximately 10 minutes.

Soldering is then conducted in three steps, wherein in a first step the structural elements to be soldered together are heated from room temperature to a temperature of approximately 300° C. for one hour, in a following second step the structural elements to be soldered together are heated from a temperature of approximately 300° C. to a temperature of approximately 550° C. within three hours, and in a third step the structural elements to be soldered together are heated from a temperature of approximately 550° C. to a temperature of approximately 1050° C. within three hours, in which case the end temperature is held for a period of approximately 5 minutes, for example.

After soldering has been accomplished, the structural elements soldered to one another are cooled to room temperature over a longer period, e.g. overnight.

In order to prevent an undesirable flow of the soldering material beyond the area to be soldered, a solder block material can be applied in the regions of the intermediate element 114 and the housing lower part 112 that are to remain free of soldering material.

Suitable solder block materials are distributed under the trade names "Stopyt Liquid" of "Stopyt Liquid #62A" by Wesgo Metals, 610 Quarry Road, San Carlos, Calif. 94070, USA.

If the soldering process is conducted in a vacuum or in a protective gas atmosphere, then it should be ensured that the oxygen partial pressure does not drop below a specific lower limit, since otherwise the cathode of the CEA unit 108 will be destroyed.

In the case of a cathode made of lanthanum strontium manganate (LSM), the lower limit for the oxygen partial pressure amounts to approximately 1 ppm ($10^{-4}$ bar); in the case of a cathode made of lanthanum strontium cobalt ferrite (LSCF), the lower limit for the oxygen partial pressure amounts to approximately 10 ppm ($10^{-3}$ bar).

Figure 3:
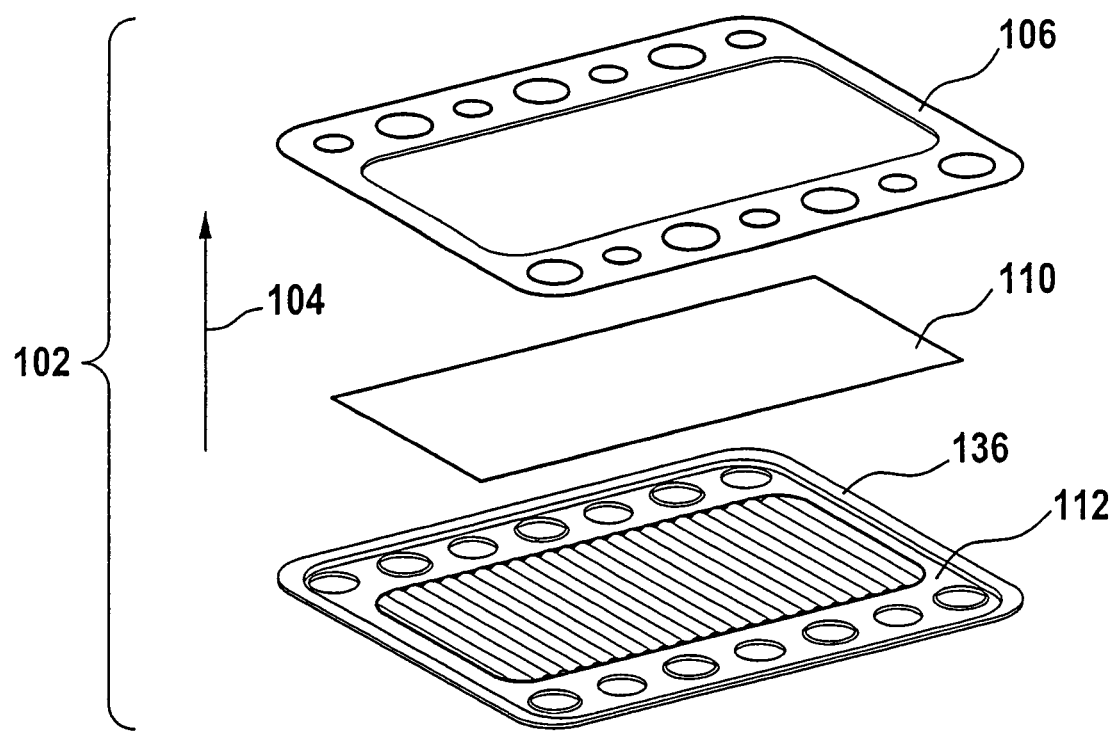
FIG. 3 is a schematic exploded view of the fuel cell unit from FIG. 2 after an intermediate element of the fuel cell unit has been soldered to a housing lower part of the fuel cell unit.

The position shown in FIG. 3 is reached after the intermediate element 114 has been soldered to the housing lower part 112.

However, it is also possible to solder the intermediate element 114 to the housing lower part 112 before the substrate 109 is connected to the housing upper part 106, or the connection of the intermediate element 114 and the housing lower part 112, on the one hand, and of the substrate 109 and the housing upper part 106, on the other, can occur simultaneously.

The contact material 110, e.g. a nickel mesh, is then inserted between the housing lower part 112 and the housing upper part 106, and the housing lower part 112 and the housing upper part 106 are then welded together to be gastight along a weld 164, which runs around the outside edge of the edge flanges 136 of the housing lower part 112 and the outside edge of the housing upper part 106, and along welds 166, which run around the inside edges of the ring flanges 148 of the housing lower part 112 and the edges of the oxidising agent feed openings 124 and the oxidising agent discharge openings 128 respectively of the housing upper part 106.

Figure 4:
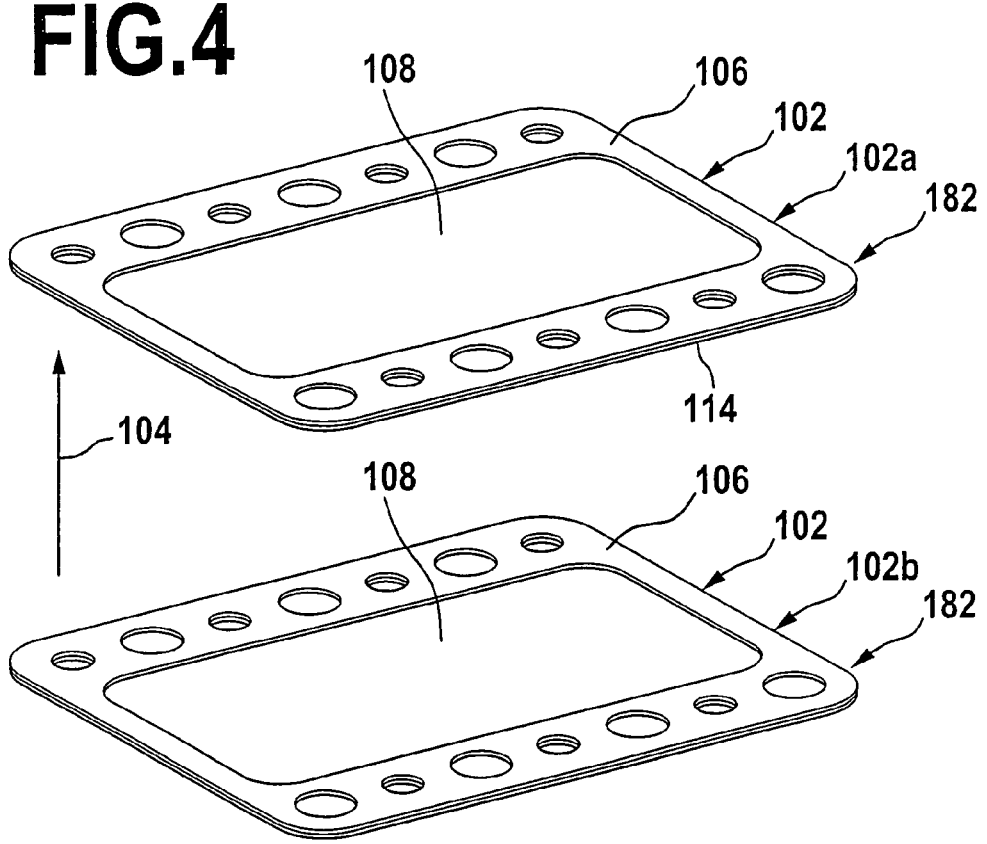
FIG. 4 is a schematic exploded view of the fuel cell unit from FIG. 3 after the housing upper part and the housing lower part have been welded to one another, and of a further second fuel cell unit of the same structure arranged below this first fuel cell unit in the stacking direction of a fuel cell stack.
Figure 5:
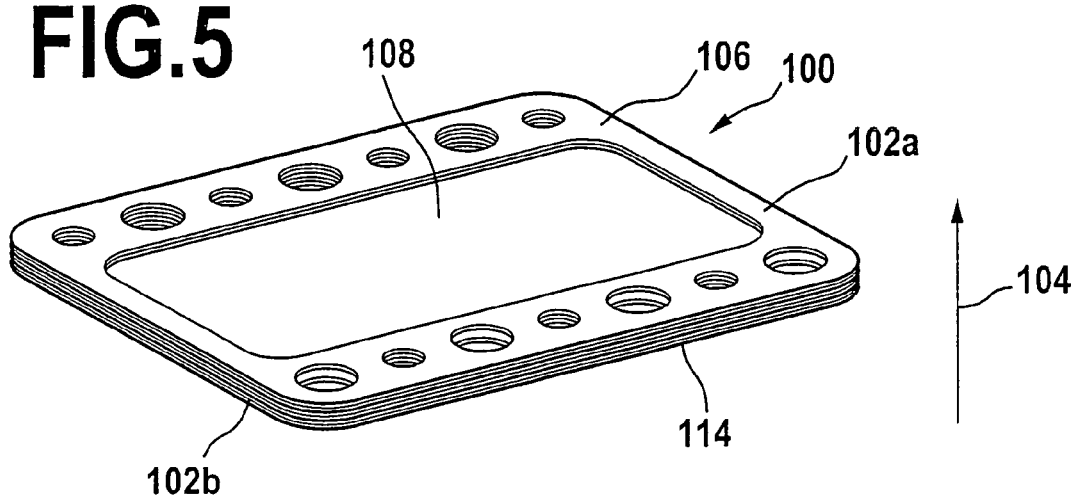
FIG. 5 is a schematic perspective view of the two fuel cell units from FIG. 4 after the additional element of the first fuel cell unit has been welded to the housing upper part of the second fuel cell unit.
Figure 6:
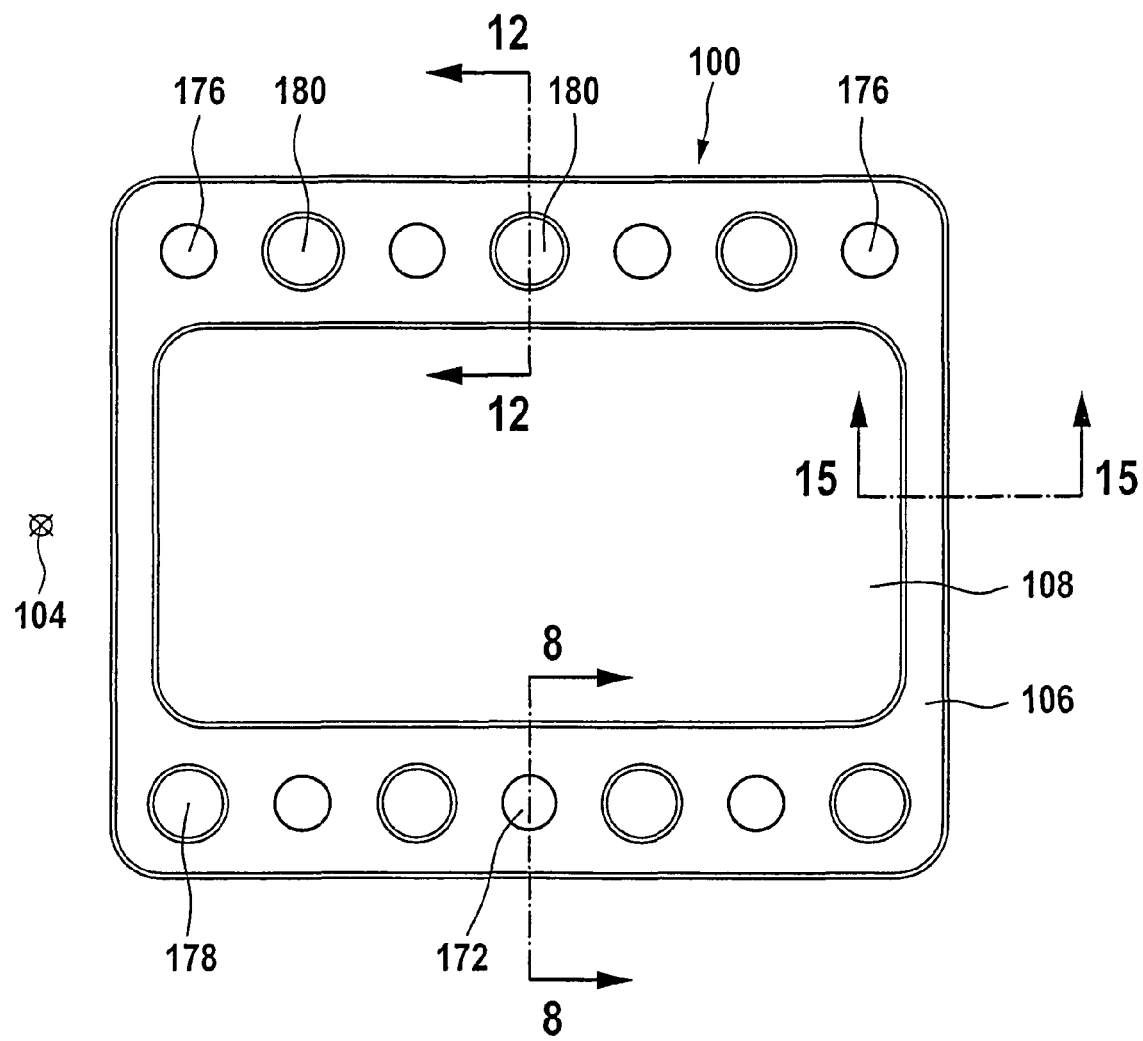
FIG. 6 is a schematic plan view from above onto a fuel cell stack.
Figure 7:
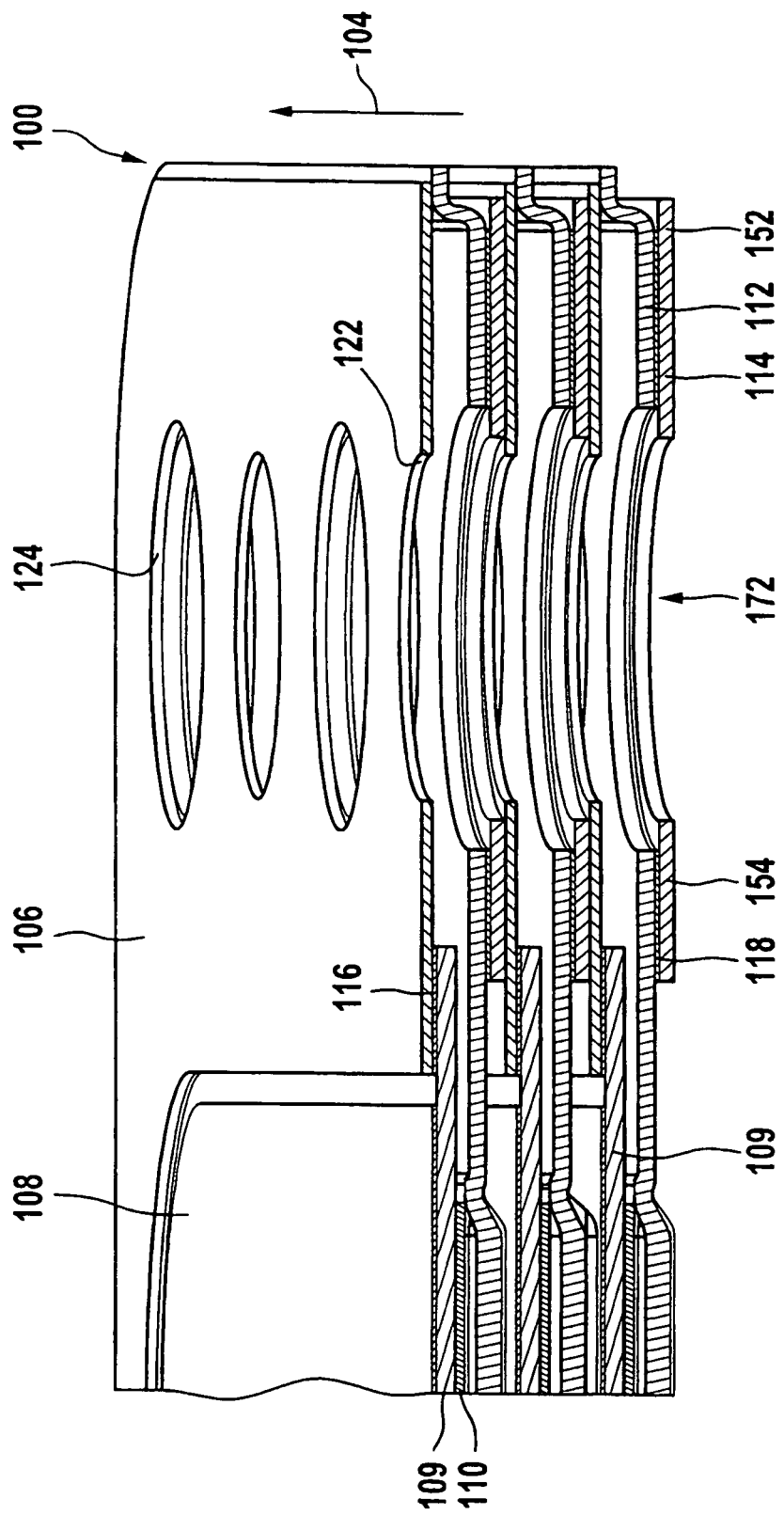
FIG. 7 is a sectional perspective view of the fuel cell stack, viewed in partial section in the region of a fuel gas duct.
Figure 8:
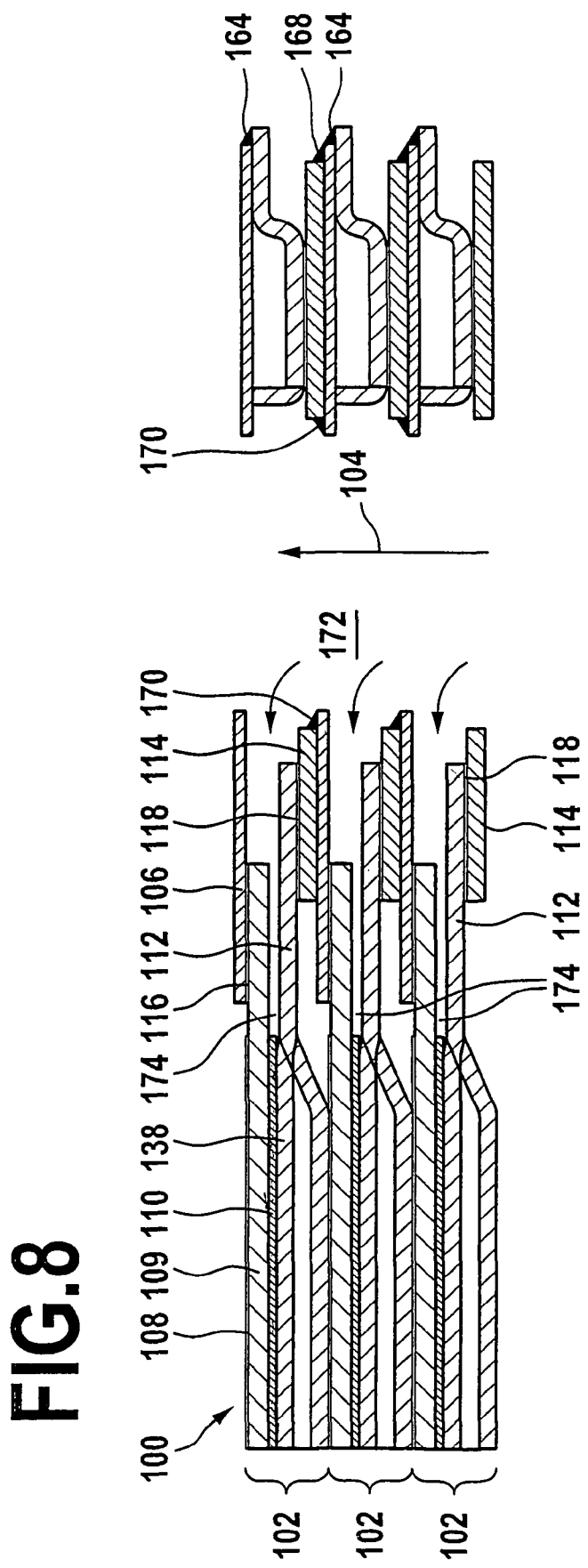
FIG. 8 is a schematic view in vertical section through the fuel cell stack in the region of a fuel gas duct, taken along line 8-8 in FIG. 6.

After this process step, the position shown in FIG. 4 is reached, in which ready assembled fuel cell units 102 are present, which must now be connected to one another to form a fuel cell stack 100 comprising a plurality of fuel cell units 102 arranged consecutively in the stacking direction 104.

The connection of two fuel cell units 102 arranged consecutively in the stacking direction 104 is achieved in the following manner:

A first fuel cell unit 102a and a second fuel cell unit 102b are inserted into a welding device so that the upper side of the housing upper part 106 of the second fuel cell unit 102b is aligned against the underside of the intermediate element 114 of the first fuel cell unit 102a.

The intermediate element 114 of the first fuel cell unit 102a is then welded to the housing upper part 106 to be gastight by means of a weld 168, which runs along the outside edges of the intermediate element 114 and the housing upper part 106, and by means of welds 170, which run in a ring around the edges of the fuel gas feed openings 156 of the intermediate element 114 and the edges of the fuel gas feed openings 122 of the housing upper part 106 aligned therewith or in a ring around the edges of the fuel gas discharge openings 158 of the intermediate element 114 and the edges of the fuel gas discharge openings 126 of the housing upper part 106 aligned therewith.

After two fuel cell units 102 have been connected to one another in this way, the fuel cell stack 100 can be gradually constructed by successively welding further fuel cell units 102 onto the intermediate element 114 of the second fuel cell unit 102b or onto the housing upper part 106 of the first fuel cell unit 102a in the stacking direction 104 until the desired number of fuel cell units 102 is reached.

In the finished fuel cell stack 100, the respectively aligned fuel gas feed openings 122, 140 and 156 of housing upper parts 106, housing lower parts 112 and intermediate elements 114 respectively form a fuel gas feed duct 172, which in each fuel cell unit 102 between the upper side of the housing lower part 112 and the underside of the housing upper part 106 opens towards a fuel gas chamber 174, which is configured between the upper side of the contact field 138 of the housing lower part 112, on one side, and the underside of the substrate 109 of the CEA unit 108, on the other.

The respectively aligned fuel gas discharge openings 126, 144 and 158 of housing upper parts 106, housing lower parts 112 and intermediate elements 114 respectively form a fuel gas discharge duct 176, which on the side of each fuel cell unit 102 opposite the fuel gas feed ducts 172 in the area between the upper side of the housing lower part 112 and the underside of the housing upper part 106 is open towards the fuel gas chamber 174.

The respectively aligned oxidising agent feed openings 124 and 142 of housing upper parts 106 and housing lower parts 112 as well as the regions of the passages 160 in the intermediate elements 114 lying between the duct boundary parts 154 of the fuel gas feed openings 140 of the intermediate elements 114 together form a respective oxidising agent feed duct 178, which is open towards the oxidising agent chamber 130 of the fuel cell unit 102 in the area of each fuel cell unit 102 between the upper side of the housing upper part 106 and the underside of the housing lower part 112 of the fuel cell unit 102 located above it in the stacking direction 104.

Similarly, the respectively aligned oxidising agent discharge openings 128 and 146 of housing upper parts 106 and housing lower parts 112 respectively together with the regions of the passages 160 in the intermediate elements 114 lying between the duct boundary parts 154 of the fuel gas discharge openings 144 of the intermediate elements 114 form a respective oxidising agent discharge duct 180, which is arranged on the side of the fuel cell units 102 opposite the oxidising agent feed ducts 178 and is likewise open towards the oxidising agent chamber 130 of the fuel cell unit 102 in the area of each fuel cell unit 102 between the upper side of the housing upper part 106 and the underside of the housing lower part 112 of the fuel cell unit 102 located above it in the stacking direction 104.

During the operation of the fuel cell stack 100, a fuel gas is fed to the fuel gas chamber 174 of each fuel cell unit 102 via the fuel gas feed ducts 172, and waste gas resulting from oxidation at the anode of the CEA unit 108 as well as unconsumed fuel gas are discharged from the fuel gas chamber 174 through the fuel gas discharge ducts 176.

Similarly, an oxidising agent, e.g. air, is fed through the oxidising agent feed ducts 178 to the oxidising agent chamber 130 of each fuel cell unit 102 and unconsumed oxidising agent is discharged from the oxidising agent chamber 130 through the oxidising agent discharge ducts 180.

During the operation of the fuel cell stack 100, the CEA units 108 have a temperature of 850° C., for example, at which the electrolyte of each CEA unit 108 is conductive for oxygen ions. The oxidising agent from the oxidising agent chamber 130 absorbs electrons from the cathode and releases di-negatively charged oxygen ions to the electrolytes, which migrate through the electrolyte to the anode. At the anode the fuel gas from the fuel gas chamber 174 is oxidised by the oxygen ions from the electrolyte and therein releases electrons to the anode.

The electrons released during the reaction at the anode are fed by the anode via the substrate 109, the contact material 110 and the housing lower part 112 to the cathode abutting against the underside of the contact field 138 of the housing lower part 112 of an adjacent fuel cell unit 102 and thus enable the cathode reaction.

The housing lower part 112 and housing upper part 106 of each fuel cell unit 102 are electrically conductively connected to one another via the welds 164, 166.

However, the housings 182 of fuel cell units 102 arranged consecutively in the stacking direction 104, which are respectively formed by a housing upper part 106, a housing lower part 112 and an intermediate element 114, are electrically insulated from one another through the ceramic coatings 162 on the upper side of the intermediate element 114 and, if present, through the ceramic coatings 150 on the underside of the housing lower parts 112. In this case, as a result of the soldering of the intermediate elements 114 to the housing lower parts 112 a gastight connection between these structural elements is assured at the same time, so that the oxidising agent chambers 130 and the fuel gas chambers 174 of the fuel cell units 102 are separated in a gastight manner from one another and from the ambient area of the fuel cell stack 100.

Figure 21:
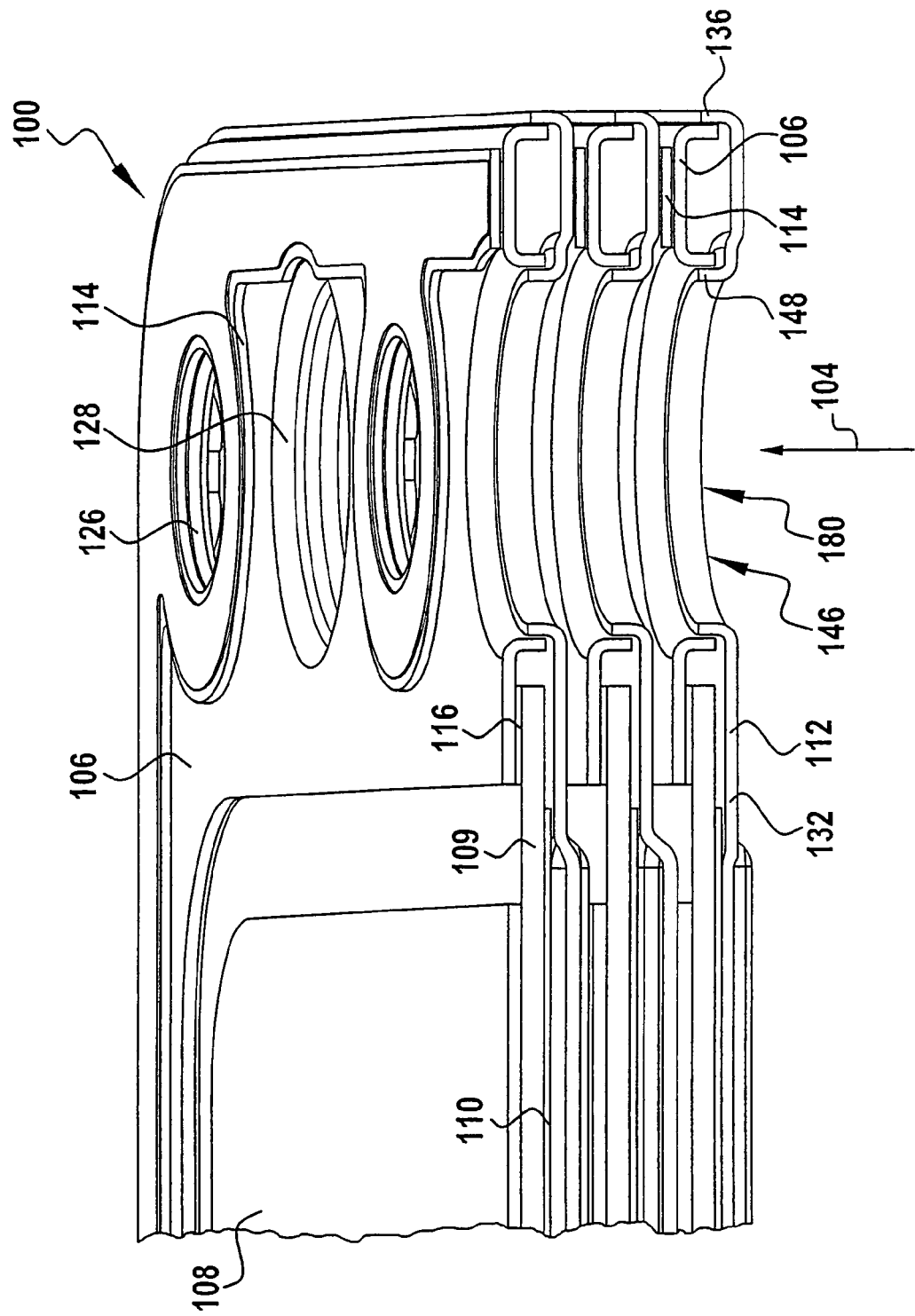
FIG. 21 is a sectional perspective view of the fuel cell stack, viewed in partial section in the region of an oxidising agent duct.
Figure 22:
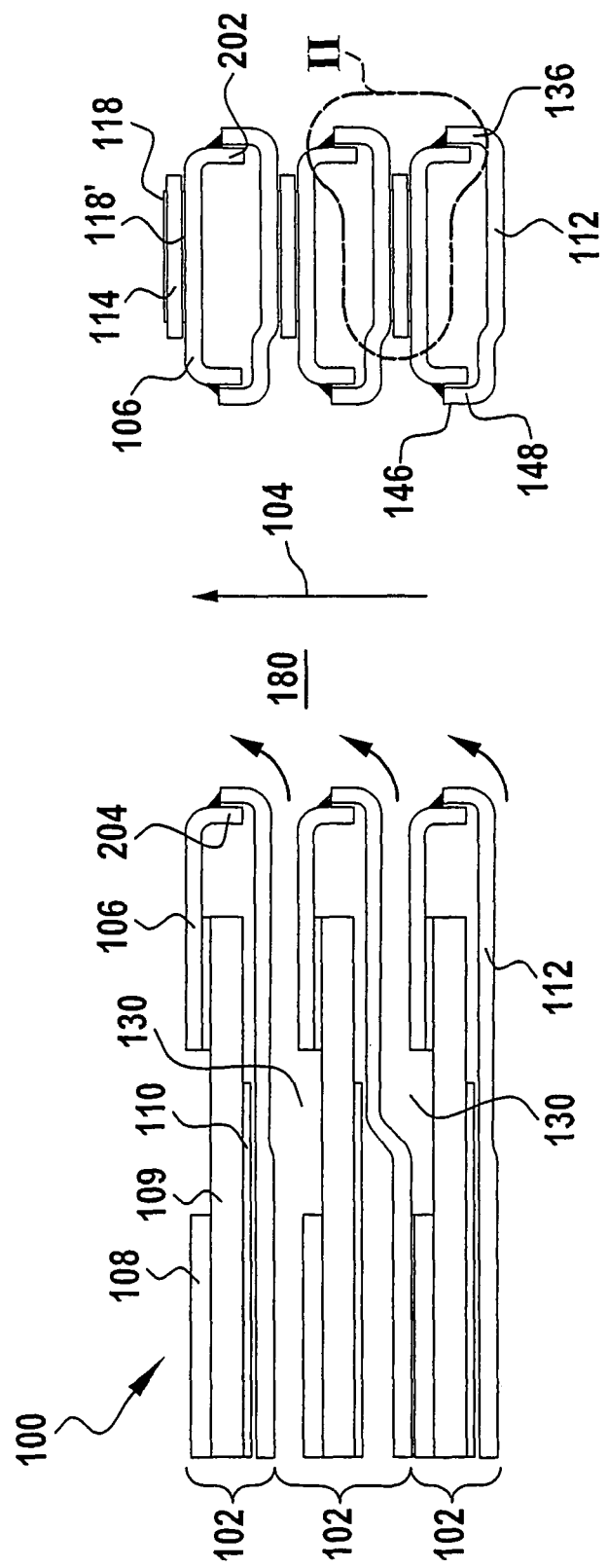
FIG. 22 is a schematic view in vertical section through the fuel cell stack in the region of the oxidising agent duct.
Figure 23:
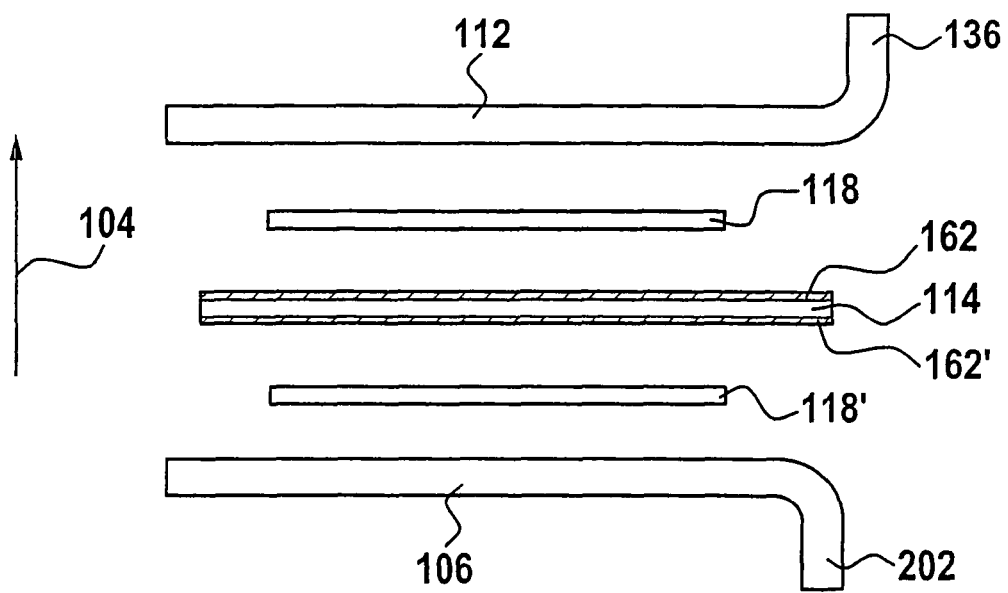
FIG. 23 is an enlarged exploded view of region II in FIG. 22.
Figure 24:
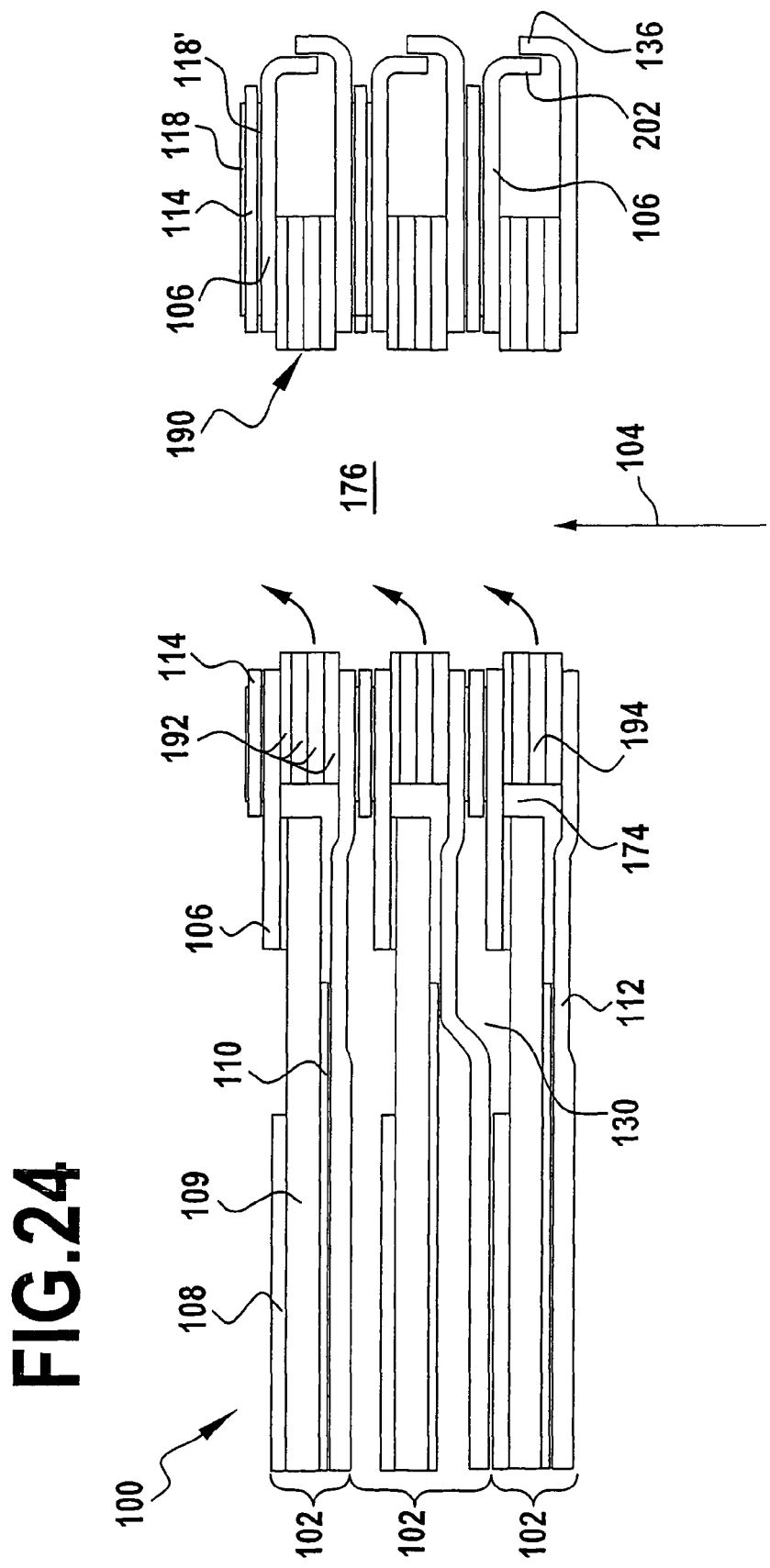
FIG. 24 is a schematic view in vertical section through the fuel cell stack in the region of a fuel gas duct.

A second embodiment of a fuel cell stack 100 shown in FIGS. 17 to 24 differs from the first embodiment shown in FIGS. 1 to 16 in that the intermediate elements 114 in the second embodiment are provided with a ceramic coating 162 or 162' not only on their side facing the housing lower part 112 of the adjacent fuel cell unit 102, but also on the side facing the housing upper part 106 of the respectively associated fuel cell unit 102, i.e. are provided with a ceramic coating on both sides, which can best be seen in FIG. 23.

The ceramic coatings 162 and 162' in this case can be configured and produced in exactly the same way as described above in association with the ceramic coating 162 of the first embodiment.

In this case, the two ceramic coatings 162 and 162' can be the same as one another or also differ from one another with respect to the material used and the coating thickness.

Since the side of the intermediate element 114 facing the housing upper part 106 is provided with the ceramic coating 162', the intermediate element 114 in this embodiment is not welded to the housing upper part 106, but instead is soldered by means of a third solder layer 118' arranged between the ceramic coating 162' and the housing upper part 106.

In this case, it should be ensured that the intermediate element 114 projects laterally over the two solder layers 118 and 118', both at its inside edge and at its outside edge, to exclude the possibility of these two solder layers coming into contact with one another, which would impair the electrical insulation effect of the sealing assembly.

The solders and soldering processes suitable for soldering the intermediate element 114 of the second embodiment to the housing lower part 112 or to the housing upper part 106 have already been described above in association with the soldering of the intermediate element 114 of the first embodiment to the housing lower part 112.

In addition, the fuel cell units 102 of the second embodiment differ from the fuel cell units 102 of the first embodiment in that the housing upper part 106 of the second embodiment is not configured to be substantially plane, but comprises a substantially rectangular plate 200, which is oriented perpendicular to the stacking direction 104 and which at its outside edge merges into an edge flange 202 oriented substantially parallel to the stacking direction 104.

Likewise in this embodiment, as may best be seen from FIGS. 21 and 22, the oxidising agent discharge openings 128, like the oxidising agent supply openings 124 of the housing upper part 106, are surrounded respectively by a ring flange 204, which surrounds the respective opening in a ring shape and is oriented substantially parallel to the stacking direction 104.

The housing lower part 112 of the second embodiment differs from the housing lower part 112 of the first embodiment in that the plate 132 of the housing lower part 112 of the second embodiment, which is substantially rectangular and is oriented perpendicular to the stacking direction 104, merges at its outside edge directly into an edge flange 136 orientated substantially parallel to the stacking direction 104.

As may best be seen from FIGS. 21 and 22, the oxidising agent discharge openings 146 (like the oxidising agent supply openings 142) of the housing lower part 112 are additionally surrounded respectively by a ring flange 148, which surrounds the respective opening in a ring shape and is oriented substantially parallel to the stacking direction 104.

To mechanically stabilise the fuel cell unit 102, spacer rings 190 are additionally provided in the second embodiment, which are arranged in the region of the fuel gas feed openings 122 or 140 and in the region of the fuel gas discharge openings 126 or 144 between the housing upper part 106 and the housing lower part 112 of the fuel cell unit 102 in order to hold the housing upper part 106 and housing lower part 112 at a distance from one another in this region.

Each of the spacer rings 190 comprises a plurality of metal layers 192 laid one on top of the other, wherein fuel gas passage ducts 194, which allow fuel gas to pass through the spacer rings 190, are configured through recesses in the metal layers 192.

The procedure for the production of the fuel cell units 102 shown in FIG. 19 from their individual elements is as follows:

Firstly, the substrate 109, on which the CEA unit 108 is arranged, is soldered along the edge of its upper side to the housing upper part 106, i.e. by means of the first solder layer 116 on the underside of the region of the housing upper side 106 surrounding the passage 120 in the housing upper part 106.

The contact material 110 and the spacer rings 190 are then inserted between the housing lower part 112 and the housing upper part 106 and possibly soldered and/or welded to the housing lower part 112 and/or to the housing upper part 106, and then the housing lower part 112 and the housing upper part 106 are welded together to be gastight along a weld, which runs around the outside edge of the edge flange 136 of the housing lower part 112 and on the edge flange 202 of the housing upper part 106, and along welds, which run around the inside edges of the ring flanges 148 of the housing lower part 112 and on the ring flanges 204 of the oxidising agent feed openings 124 and the oxidising agent discharge openings 128 respectively of the housing upper part 106.

Figure 18:
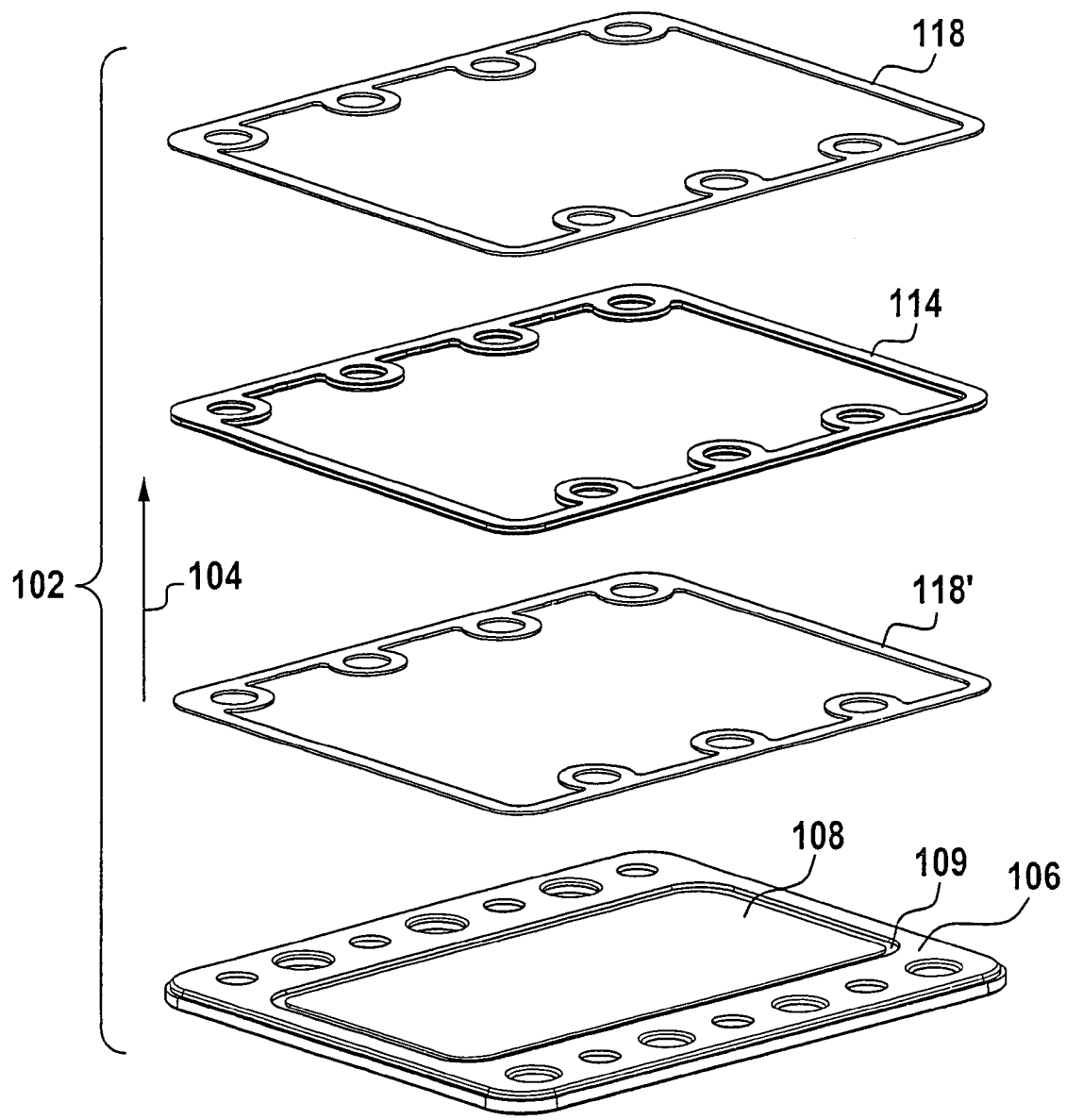
FIG. 18 is a schematic exploded view of the fuel cell unit from FIG. 17 after a substrate of a CEA unit of the fuel cell unit has been soldered to a housing upper part of the fuel cell unit and after the housing upper part and a housing lower part of the fuel cell unit have been welded to one another.

The position shown in FIG. 18 is reached after this process step.

On its side facing the housing upper part 106 and provided with the ceramic coating 162', the intermediate element 114 provided with ceramic coatings 162 and 162' respectively on both sides is now soldered by means of the solder layer 118' to the housing upper part 106 on its upper side facing the intermediate element 114.

In this case, the same soldering materials can be used as have been described above in association with the soldering of the intermediate element 114 of the first embodiment and the housing lower part 112, and the soldering process can be conducted under the same conditions.

Figure 19:
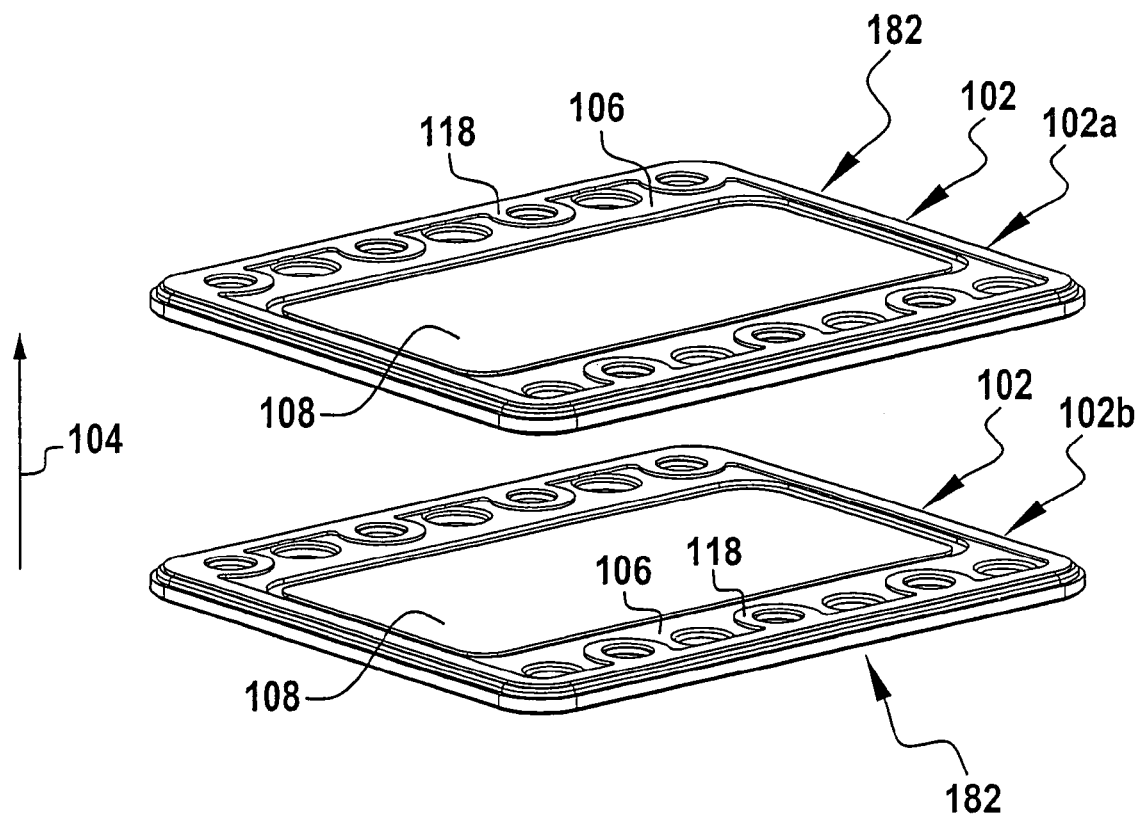
FIG. 19 is a schematic exploded view of the fuel cell unit from FIG. 18 after the housing upper part has been soldered to an intermediate element of the fuel cell unit, and of a further second fuel cell unit of the same structure arranged below this first fuel cell unit in the stacking direction of a fuel cell stack.

The position shown in FIG. 19 is reached after the intermediate element 114 has been soldered to the housing upper part 106 and the further solder layer 118 has been applied to the ceramic coating 162 on the side of the intermediate element 114 remote from the housing upper part 106.

However, it is also possible to solder the intermediate element 114 to the adjacent housing lower part 112 before the intermediate element 114 is soldered to the housing upper part 106.

It can additionally also be provided that the solder layer 118' is applied to the upper side of the housing upper part 106 and the solder layer 118 is applied to the underside of the housing lower part 112, pressed thereon, for example, and the intermediate element 114 provided with the ceramic coatings 162, 162' is then inserted between the two solder layers and is soldered to the housing upper part 106 and the housing lower part 112 simultaneously by application of weight.

Working from the position shown in FIG. 19, two fuel cell units 102 arranged consecutively in the stacking direction 104 are connected to one another by the housing lower part 112 of the upper fuel cell unit 102a being soldered by means of the solder layer 118 to the intermediate element 114 of the fuel cell unit 102b located below it.

In this case, the same soldering materials can be used as have been described above in association with the soldering of the intermediate element 114 of the first embodiment and the adjacent housing lower part 112, and the soldering process can be conducted under the same conditions.

Figure 20:
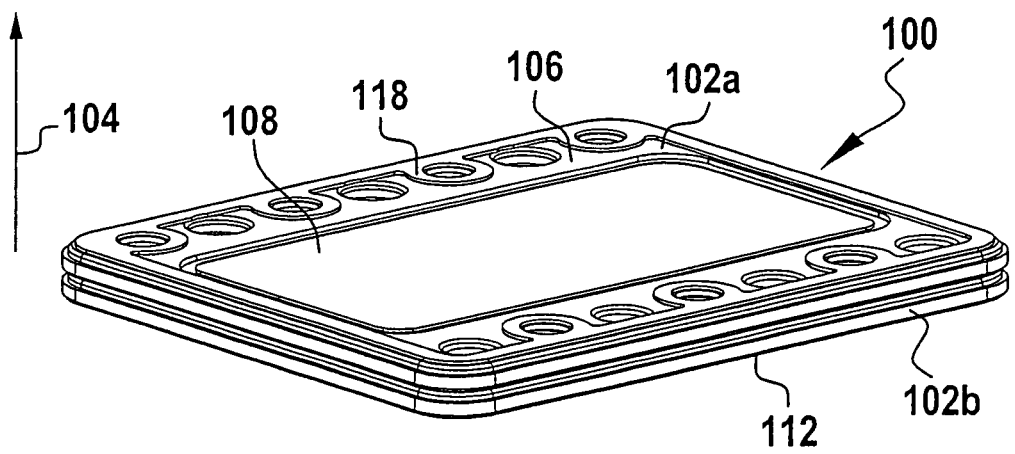
FIG. 20 is a schematic perspective view of the two fuel cell units from FIG. 19 after the additional element of the first fuel cell unit has been soldered to the housing upper part of the second fuel cell unit.

The fuel cell units 102a 102b connected to one another in this way are shown in FIG. 20.

To expand the fuel cell stack 100, further fuel cell units 102 can be soldered onto the upper fuel cell unit 102a and/or onto the lower fuel cell unit 102b.

The housing lower part 112 and the housing upper part 106 of each fuel cell unit 102 are in this case connected electrically conductively to one another by the above-described welds.

However, the housings 182 of fuel cell units 102 arranged consecutively in the stacking direction 104, which are respectively formed by a housing upper part 106 and a housing lower part 112, are electrically insulated from one another through the sealing assembly, which is formed by the intermediate element 114 and the ceramic coatings 162, 162' arranged thereon, between the upper side of the housing upper parts 106 and the underside of the housing lower parts 112.

In this case, as a result of this sealing assembly a gastight connection between these structural elements is assured at the same time, so that the oxidising agent chambers 130 and the fuel gas chambers 174 of the fuel cell units 102 are separated in a gastight manner from one another and from the ambient area of the fuel cell stack 100.

Otherwise, the second embodiment of a fuel cell stack shown in FIGS. 17 to 24 is the same with respect to its structure and function as the first embodiment shown in FIGS. 1 to 16, and reference is made to the above description in this regard.

Figure 25:
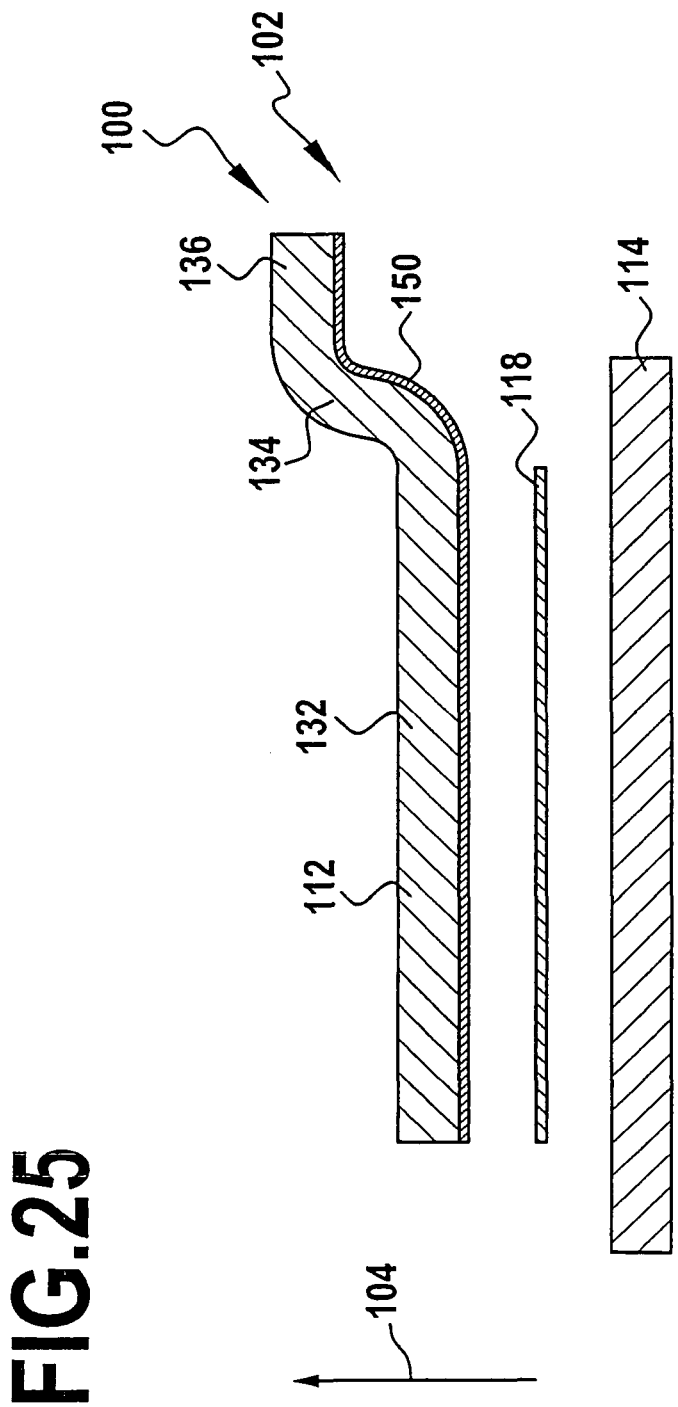
FIG. 25 is an enlarged exploded view corresponding to FIG. 10 of a housing lower part of a fuel cell unit provided with a ceramic coating, of a solder layer and of an intermediate element that is not provided with a ceramic coating in a third embodiment of a fuel cell stack.

A third embodiment of a fuel cell stack shown in FIG. 25 differs from the first embodiment shown in FIGS. 1 to 16 only in that the intermediate elements 114 in the third embodiment are not provided with an electrically insulating ceramic coating, but are composed exclusively of metallic and electrically conductive material.

The electrical insulation effect of the sealing assembly in this embodiment is assured in that the housing lower part 112 of the fuel cell unit 102 arranged above an intermediate element 114 respectively in the stacking direction 104 is provided on its underside facing the intermediate element 114 with a ceramic coating 150 made of a ceramic material, which has an electrical insulation effect at the operating temperature of the fuel cell unit 102.

In this case, the ceramic coating 150 of the housing lower part 112 can be configured and produced in exactly the same manner as that described above in association with the ceramic coating 150 of the first embodiment of the fuel cell stack.

On its side facing the intermediate element 114 and provided with the ceramic coating 150, the housing lower part 112 provided with the ceramic coating 150 is soldered by means of the solder layer 118 to the intermediate element 114 not provided with a ceramic coating 162 on its upper side facing the housing lower part 112, as has been described above in association with the soldering of the intermediate element 114 and the housing lower part 112 of the first embodiment of the fuel cell stack 100.

Otherwise, the third embodiment of a fuel cell stack shown in FIG. 25 is the same with respect to its structure and function as the first embodiment shown in FIGS. 1 to 16, and reference is made to the above description in this regard.

Figure 26:
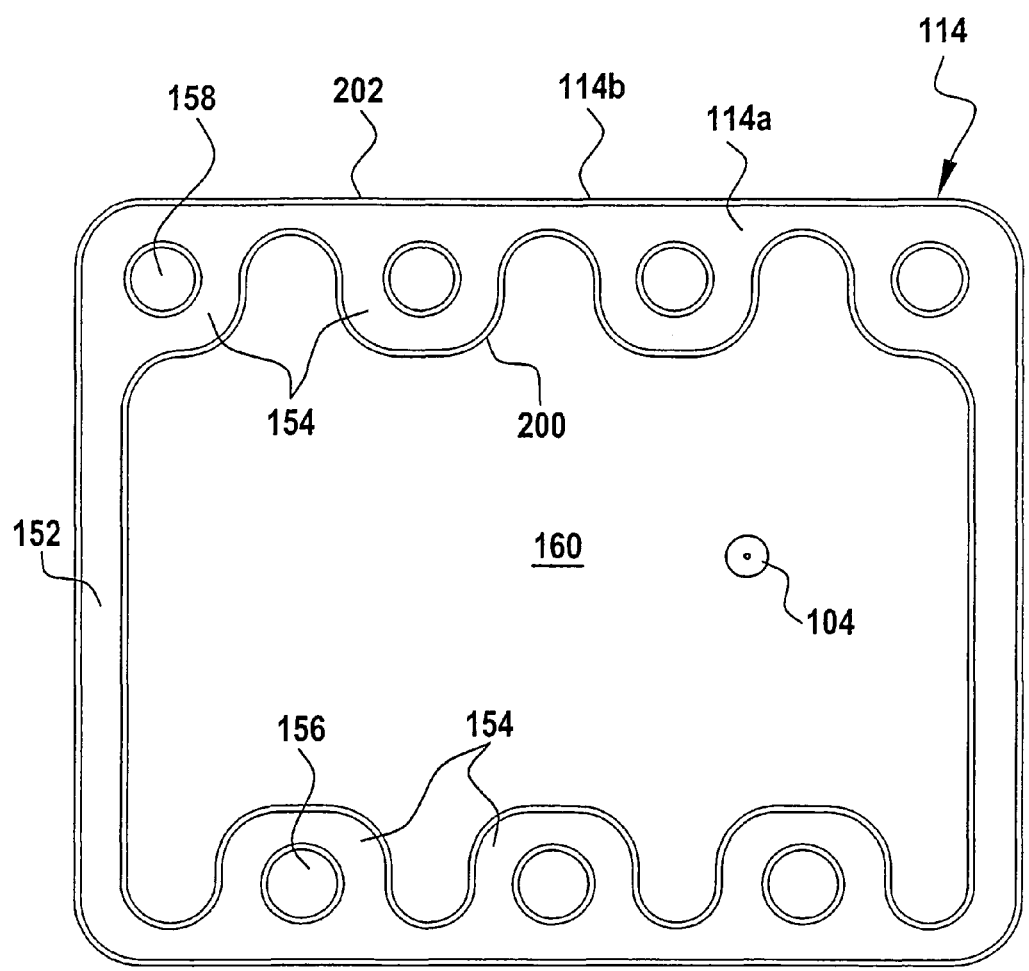
FIG. 26 is a schematic plan view from above onto a two-part intermediate element of a fourth embodiment of a fuel cell stack.
Figure 27:
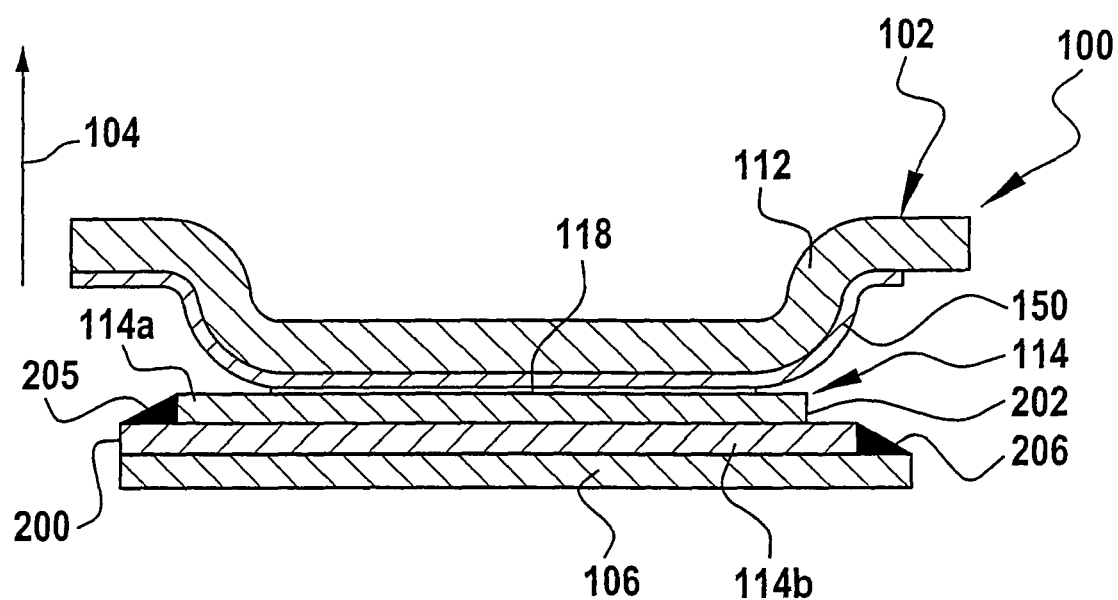
FIG. 27 is a schematic view in vertical section through a housing lower part of a first fuel cell unit provided with a ceramic coating, a two-part intermediate element and a housing upper part of a second fuel cell unit in the fourth embodiment of a fuel cell stack.

A fourth embodiment of a fuel cell stack 100 shown in FIGS. 26 and 27 differs from the above-described embodiments in that the intermediate elements 114 in the fourth embodiment are not single-part, but two-part elements.

As may be seen from FIGS. 26 and 27, each of the intermediate elements 114 respectively comprises two intermediate element parts 114a and 114b, which are both configured substantially like one of the single-part intermediate elements 114 of the above-described embodiments.

Each of the intermediate element parts 114a, 114b thus comprises a substantially rectangular frame part 152, which extends in a ring shape around the edge of the fuel cell unit 102, as well as duct boundary parts 154 connected in one piece to the frame part 152, which are configured so that together with the frame part 152 they respectively enclose a fuel gas feed opening 156 or respectively a fuel gas discharge opening 158 of the respective intermediate element part 114a and 114b.

The fuel gas feed openings 156 and the fuel gas discharge openings 158 of the intermediate element parts 114a, 114b are aligned with one another and with the fuel gas feed openings 140 and the fuel gas discharge openings 144 respectively of the housing lower part 112 and also with the fuel gas feed openings 122 and with the fuel gas discharge openings 126 respectively of the housing upper part 106.

The intermediate element parts 114a, 114b are respectively produced from a substantially plane metal sheet by stamping out the fuel gas feed openings 156 and the fuel gas discharge openings 158 as well as a central passage 160.

A highly corrosion-resistant steel, e.g. the alloy Crofer 22, is preferably used as material for the intermediate element parts 114.

As may be seen from FIGS. 26 and 27, the intermediate element part 114b adjacent to the housing upper part 106 of an adjacent fuel cell unit 102 projects, both along its inside edge 200 and along its outside edge 202 and along the edges of the fuel gas feed openings 156 and the edges of the fuel gas discharge openings 158, laterally, i.e. in a direction perpendicular to the stacking direction 104, over the corresponding edges of the intermediate element part 114a adjacent to the housing lower part 112 of an adjacent fuel cell unit 102.

The first intermediate element part 114a and the second intermediate element 114b are connected to one another to be gastight by means of welds 205 running around the inside edges 200 of the intermediate element parts 114a, 114b and along the edges of the fuel gas feed openings 156 and also around the fuel gas discharge openings 158.

In addition, the second intermediate element part 114b is connected to the upper side of the housing upper part 106 of the adjoining fuel cell unit 102 to be gastight by means of a weld 206 running around its outside edge 202.

However, the outside edges 202 of the first intermediate element part 114a and the second intermediate element part 114b are not welded to one another, nor are they secured to one another in any other manner, and therefore the region of the first intermediate element part 114a adjoining the outside edge 202 can move slightly relative to the second intermediate element part 114b, i.e. in particular in the stacking direction 104 of the fuel cell stack 100.

As a result of this ability of the intermediate element parts 114a and 114b to move slightly relative to one another, it is possible to compensate component tolerances and also reduce tensile stresses, which arise as a result of the contraction of the welds 205, 206 during cooling and/or during the cyclic heating to operating temperature and cooling to ambient temperature of the fuel cell stack 100 during operation of the fuel cell stack 100.

In this way, the tightness and service life of the fuel cell stack 100 according to the invention is increased.

In the fourth embodiment of a fuel cell stack 100 shown in FIGS. 26 and 27, none of the intermediate element parts 114a, 114b is provided with an electrically insulating ceramic coating.

Instead, the electrical insulation effect of the sealing assembly in this embodiment is assured by an electrically insulating ceramic coating 150 on the underside of the housing lower part 112 adjoining the intermediate element 114.

The first intermediate element part 114a in this embodiment is connected by means of a solder layer 118 to the ceramic coating 150 of the housing lower part 112 in the same way as that described above in the first embodiment shown in FIGS. 1 to 16.

However, alternatively or additionally to an electrically insulating ceramic coating 150 on the housing lower part 112, an electrically insulating ceramic coating could also be provided on the upper side of the first intermediate element part 114a facing the housing lower part 112.

Such a ceramic coating in this case can be configured and produced in exactly the same way as described above in association with the ceramic coating 162 of the intermediate element 114 of the first embodiment.

Otherwise, the embodiment of a fuel cell stack 100 shown in FIGS. 26 and 27 is the same with respect to its structure and function as the first three embodiments with a single-part intermediate element, and reference is made to the above description thereof in this regard.

The invention claimed is:

1. Fuel cell stack comprising a first fuel cell unit and a second fuel cell unit, which are arranged adjacent one another in a stacking direction, wherein each of the first fuel cell unit and second fuel cell unit comprises a housing comprising a housing upper part made of a metallic material and a housing lower part made of a metallic material, and a sealing assembly between the adjacent first fuel cell unit and second fuel cell unit comprising at least one intermediate element which is distinct from the housing upper parts and from the housing lower parts of the first and second fuel cell units and made from a metallic sheet of a metallic corrosion-resistant steel material, wherein the intermediate element is soldered to the housing upper part or the housing lower part of the first fuel cell unit at at least one first location by means of a solder layer which is distinct from the intermediate member and consists of a metal solder which is solid at a temperature in the range of approximately 800° C. to approximately 900° C. and is welded and/or soldered to the adjacent housing lower part or the adjacent housing upper part of the second fuel cell unit at at least one second location; wherein at least one of
the intermediate element is provided with a ceramic coating made of a ceramic material and is soldered to the housing upper part or the housing lower part of the first fuel cell unit at the at least one first location, wherein the at least one first location is provided with the ceramic coating of the intermediate element,
and the housing upper part or the housing lower part of the first fuel cell unit is itself provided with a ceramic coating made of a ceramic material.

2. Fuel cell stack having a sealing assembly according to claim 1, wherein the intermediate element comprises a frame part, which extends in a ring shape around fluid ducts passing through the fuel cell stack in the stacking direction.

3. Fuel cell stack having a sealing assembly according to claim 2, wherein the intermediate element comprises at least one duct boundary part, which is connected to the frame part and either alone or together with the frame part encloses one of the fluid ducts passing through the fuel cell stack.

4. Fuel cell stack having a sealing assembly according to claim 3, wherein the intermediate element respectively has a duct boundary part associated with a respective duct for each fuel gas feed duct and each fuel gas discharge duct.

5. Fuel cell stack having a sealing assembly according to claim 3, wherein the intermediate element respectively comprises a duct boundary part for each oxidising agent feed duct and each oxidising agent discharge duct.

6. Fuel cell stack having a sealing assembly according to claim 1, wherein the ceramic coating is composed of at least one of the group consisting of aluminium oxide, titanium dioxide, zirconium dioxide, and magnesium oxide.

7. Fuel cell stack having a sealing assembly according to claim 1, wherein the ceramic coating is produced by thermal spraying.

8. Fuel cell stack having a sealing assembly according to claim 1, wherein the intermediate element and/or the housing part of the first fuel cell unit is formed from a metal alloy, which contains an oxidisable component.

9. Fuel cell stack having a sealing assembly according to claim 8, wherein the metal alloy contains aluminium and/or zirconium as oxidisable component.

10. Fuel cell stack having a sealing assembly according to claim 8, wherein the ceramic coating is produced by oxidation of an oxidisable component of the metal alloy.

11. Fuel cell stack having a sealing assembly according to claim 1, wherein the ceramic coating of the intermediate element and/or the ceramic coating of the housing upper part or the housing lower part of the first fuel cell unit has a thickness of approximately 20 μm to approximately 1000 μm.

12. Fuel cell stack having a sealing assembly according to claim 1, wherein the intermediate element is soldered to the housing part of the first fuel cell unit by means of a silver-based solder with added copper.

13. Fuel cell stack having a sealing assembly according to claim 1, wherein the intermediate element is soldered to the housing part of the first fuel cell unit by means of a silver-based solder without added copper.

14. Fuel cell stack having a sealing assembly according to claim 13, wherein the silver-based solder contains an addition of copper oxide.

15. Fuel cell stack having a sealing assembly according to claim 1, wherein the intermediate element is soldered to the housing part of the first fuel cell unit by means of a silver-based solder with added titanium.

16. Fuel cell stack having a sealing assembly according to claim 1, wherein the intermediate element is provided with a ceramic coating both on a side facing the housing part of the first fuel cell unit and on a side facing the housing part of the second fuel cell unit.

17. Fuel cell stack having a sealing assembly according to claim 1, wherein the intermediate element is soldered to the housing part of the second fuel cell unit by means of a metal solder at at least one location provided with a ceramic coating.

18. Fuel cell stack having a sealing assembly according to claim 1, wherein the intermediate element comprises at least two separate intermediate element parts, which are connected to one another.

19. Fuel cell stack having a sealing assembly according to claim 18, wherein at least two separate intermediate element parts are welded and/or soldered to one another.

20. Fuel cell stack having a sealing assembly according to claim 18, wherein at least two separate intermediate element parts are stacked one on top of the other in the stacking direction of the fuel cell stack.

21. Fuel cell stack having a sealing assembly according to claim 18, wherein at least one intermediate element part projects over an adjacent intermediate element part on an inside edge and/or on an outside edge.

22. Fuel cell stack having a sealing assembly according to claim 18, wherein at least two intermediate element parts are connected to one another so that at least one region of one intermediate element part can move relative to a region of the other intermediate element part.

23. Fuel cell stack having a sealing assembly according to claim 7, wherein the ceramic coating is produced by atmospheric plasma spraying, by vacuum plasma spraying or by flame spraying.

\* \* \* \* \*